US007228129B1

(12) United States Patent
Ward et al.

(10) Patent No.: US 7,228,129 B1
(45) Date of Patent: Jun. 5, 2007

(54) EXPERT SYSTEM FOR MONITORING, RECORDING AND CONTROLLING REMOTE EQUIPMENT THAT MINIMIZES WIRELESS TELEPHONE AIRTIME

(75) Inventors: Thomas Owen Ward, Greenwood, IN (US); Steven Hodges, Boise, ID (US)

(73) Assignee: Logical Concepts, Inc., Greenwood, IN (US)

( * ) Notice: Subject to any disclaimer, the term of this patent is extended or adjusted under 35 U.S.C. 154(b) by 747 days.

(21) Appl. No.: 10/102,335

(22) Filed: Mar. 20, 2002

Related U.S. Application Data

(60) Provisional application No. 60/276,916, filed on Mar. 20, 2001, provisional application No. 60/276,917, filed on Mar. 20, 2001.

(51) Int. Cl.
*H04Q 7/20* (2006.01)
*H04B 17/00* (2006.01)

(52) U.S. Cl. .............. 455/423; 455/67.11; 455/115.1; 455/226.1

(58) Field of Classification Search ........ 455/405–408, 455/423, 424–425, 458, 522, 67.11, 67.13, 455/115.1–115.4, 226.1–226.4, 404.1, 404.2
See application file for complete search history.

(56) References Cited

U.S. PATENT DOCUMENTS 5,365,516 A * 11/1994 Jandrell ................. 370/335
5,546,444 A    8/1996 Roach, Jr. et al. ............ 379/59
5,570,413 A * 10/1996 Ahlberg et al. .......... 455/550.1
5,594,740 A    1/1997 LaDue ........................ 379/59
5,675,371 A   10/1997 Barringer ...................... 348/6
6,147,601 A   11/2000 Sandelman et al. ......... 340/506
6,150,955 A   11/2000 Tracy et al. ........... 340/870.02
6,175,732 B1   1/2001 McDaniel et al. .......... 455/433

* cited by examiner

*Primary Examiner*—Duc M. Nguyen
*Assistant Examiner*—Michael Thier
(74) *Attorney, Agent, or Firm*—Brinks Hofer Gilson & Lione

(57) ABSTRACT

A system for remote monitoring and control of remotely located equipment that minimizes wireless airtime includes an interface device coupled with the remote equipment. The interface device selectively communicates over a wireless network with a central server and/or a user device. Wireless communication with the interface device is field configurable by a user to be selectively triggered base on user specified operational conditions. Communication by the interface device may be with one of a first protocol and a second protocol based on user specified operating conditions to optimize wireless airtime. The first protocol includes a user configured data string to select information to be transmitted based on the user specified operating conditions. The second protocol includes a user configurable datafile selectively transmitted over a voice channel of the wireless network based on the user specified operating conditions. Messages communicated with the first and second protocol may be selectively utilized to generate an alert message to the user device based on a user configured message profile.

32 Claims, 11 Drawing Sheets

EXPERT SYSTEM FOR MONITORING, RECORDING AND CONTROLLING REMOTE EQUIPMENT THAT MINIMIZES WIRELESS TELEPHONE AIRTIME

This application claims the benefit of U.S. Provisional Application Ser. No. 60/276,916, filed Mar. 20, 2001; and U.S. Provisional Application Ser. No. 60/276,917, filed Mar. 20, 2001.

FIELD OF THE INVENTION

The present invention relates generally to monitoring, recording and controlling remote equipment and more particularly, to methods and systems for remotely monitoring, recording and controlling remote equipment using wireless communication where airtime is minimized.

BACKGROUND

Several technologies currently exist for monitoring and control of remote equipment, such as, for example, sewer lift stations, gas pipelines, electrical distribution equipment, etc. These technologies include, for example, automatic telephone alarm dialers/data collector systems, licensed or non-licensed communication data radio systems, cellular data collectors/alarm dialer systems, hardwired interface/network systems, and satellite interface systems. Land-line telephone systems and/or hardwired networks are typically impractical for use in monitoring remotely located equipment. This is especially the case in areas with difficult geographic terrain due to the cost and complexity of obtaining land easements, as well as installing communication cables.

Existing wireless technologies overcome some disadvantages associated with land-line systems, but also introduce other disadvantages. Such disadvantages include the cost and complexity of establishing a suitable antenna system for reliable transmission of computer data over radio waves. In addition, part of establishing an antenna system typically includes laborious radio propagation studies to determine the expected wireless reliability of such a system. Although some of these issues may be avoided using existing wireless communication systems such as, for example, cellular voice systems and/or satellite communications, communication hardware costs, monthly fees and wireless airtime expenses may be significant. For example, in airtime fee-based systems, airtime charges may be expensive and unpredictable when equipment malfunctions and registers a large amount of airtime, or has to repeatedly re-send data that is corrupted because of poor and/or unpredictable cellular-voice-channel connections.

Current technologies for providing both remote monitoring and control are typically large, elaborate and complex systems. These systems require specialized training and/or knowledge to implement, as well as configure the communications associated with such systems. In addition, many such systems provide only one-way data delivery services and/or provide services that rely on proprietary communication devices and/or software for remote monitoring and control. Further, such systems typically include significant amounts of hardware and specialized software programming.

Due to the disadvantages associated with prior art remote monitoring and control techniques, there are significant amounts of remote equipment that is currently not remotely monitored or controlled. This remote equipment typically represents smaller more remotely located sites where it is simply not economically feasible to provide automatic, remote monitoring. The failure of equipment at one of these sites may, however, have serious and significant consequences. Especially since failures in such remote locations may go unnoticed for an extended period of time. For example, the failure of a remotely located sewage lift station may allow raw sewage to dump into creeks, rivers and the general environment causing a possible safety hazard. Accordingly, there is a need for a simple, effective, low-cost method and system to remotely monitor and control equipment located in remote locations.

SUMMARY

The presently preferred embodiments disclose a remote monitoring system for monitoring and controlling remote equipment utilizing wireless communication. The remote monitoring system is a simple, easily installed and maintained system that may be customized by a user to minimize wireless airtime while still providing desired levels of monitoring and control.

The remote monitoring system includes at least one interface device in bi-directional communication with at least one central server or at least one user device. The user device may be operated by a user of the remote monitoring system. The interface device is preferably positioned at or near a remote site. Equipment associated with the remote site may be electrically coupled with the interface device. The interface device may receive electrical signals indicative of various operational parameters of the equipment. In addition, the interface device may communicate with the central server and/or the user device over a wireless network. In the presently preferred embodiments, the interface device may be customized by the user to selectively utilize either a first protocol or a second protocol for wireless communication with the central server and/or the user device. Dynamic selection by the interface device of the first and second protocol may be based on operational conditions specified by the user.

The first protocol is a user customizable packet based protocol that includes a fully configurable data string. Accordingly, the user may minimize wireless airtime by customizing data strings in the first protocol to provide only that information desired by the user. Further, the first protocol may be configured by the user to carry only as much data as will fit into a datapacket of the wireless communication mechanism. In one embodiment, the first protocol may be configured by users for inclusion as part of the handshaking data communicated over wireless control channels. In another embodiment, the first protocol may be configured by users for encapsulation in a transport protocol used to transport datapackets over wireless networks. Users may further configure the first protocol to provide exception messages pertaining to operational conditions and/or calculation results involving the remote site. The exception messages may be communicated to the central server and/or the user device with optimal efficiency by minimizing wireless airtime while still providing desirable information related to operational conditions. Further, the first protocol may be utilized by either the central server or the user device to communicate with the interface device.

The second protocol transmits datafile messages that may include historical operational information, configuration information and control information. Transmission of datafile messages with the second protocol may occur over wireless voice communication channels. The second protocol may be utilized for communication from the interface device to the central server and/or the user device, as well as for communication from the central server or the user device to the interface device. The second protocol advantageously uses data compression and transmission techniques to minimize wireless airtime.

Messages received by the central server may be processed to selectively generate alert messages. The alert messages may be transmitted to at least one user device. The central server may determine when to generate alert messages along with the contents and recipient(s) of such alert messages based on a user configured message profile. In response to an alert message, a user may send a response message with the user device. The response message may include instructions to, for example, control equipment associated with the remote site. The central server or the user device may transmit the response message with either the first or second protocol to the interface device. The interface device may in turn output control signals to the equipment associated with the remote site.

An interesting feature of remote monitoring system involves the selective utilization of the first and second protocol. The user may specify operational conditions under which communication with the first protocol or the second protocol is warranted. Accordingly, the user has control over not only the amount of wireless airtime but also the operating conditions under which such communication may occur.

Another interesting feature of the remote monitoring system involves exception messages generated with the first protocol. User specified operating conditions may trigger generation of the first protocol. A user configured logic statement may be used to identify the operating conditions triggering generation of the first protocol. In addition, the logic statement may identify a logic string to include in the exception message. The logic string may be configured by the user to include operational parameters and/or other information indicative of the operating conditions that triggered generation of the exception message. Accordingly, the user may not only configure the operating conditions that trigger generation of an exception message but also customize the contents of the exception message.

Yet another interesting feature of the remote monitoring system involves the interface device. The interface device includes capabilities to communicate with other intelligent devices associated with the remote site. The intelligent devices may be enabled to communicate over the wireless network through the interface device using the first and second protocols to minimize wireless airtime.

Still another interesting feature of the remote monitoring system involves one embodiment in which the interface device includes the message profile configured by a user. In this embodiment, the interface device not only selectively utilizes the first protocol for messages, but also selectively routes such messages to the user device and/or the central server based on the message profile.

Further objects and advantages of the present invention will be apparent from the following description, reference being made to the accompanying drawings wherein preferred embodiments of the present invention are clearly shown.

DETAILED DESCRIPTION OF THE PREFERRED EMBODIMENTS

The presently preferred embodiments describe a remote monitoring system for monitoring, recording and controlling remotely located equipment. The remote monitoring system is simple and cost-effective to install and operate. In addition, the system includes communication over wireless networks to reach remote locations effectively and efficiently. Communication over the wireless networks may be advantageously configured by a user of the system to minimize wireless airtime while still providing desired monitoring, recording and control of remote equipment. Accordingly, the remote monitoring system provides a cost effective solution for remotely located sites where it is desirable to efficiently and economically perform monitoring and control.

Figure 1:
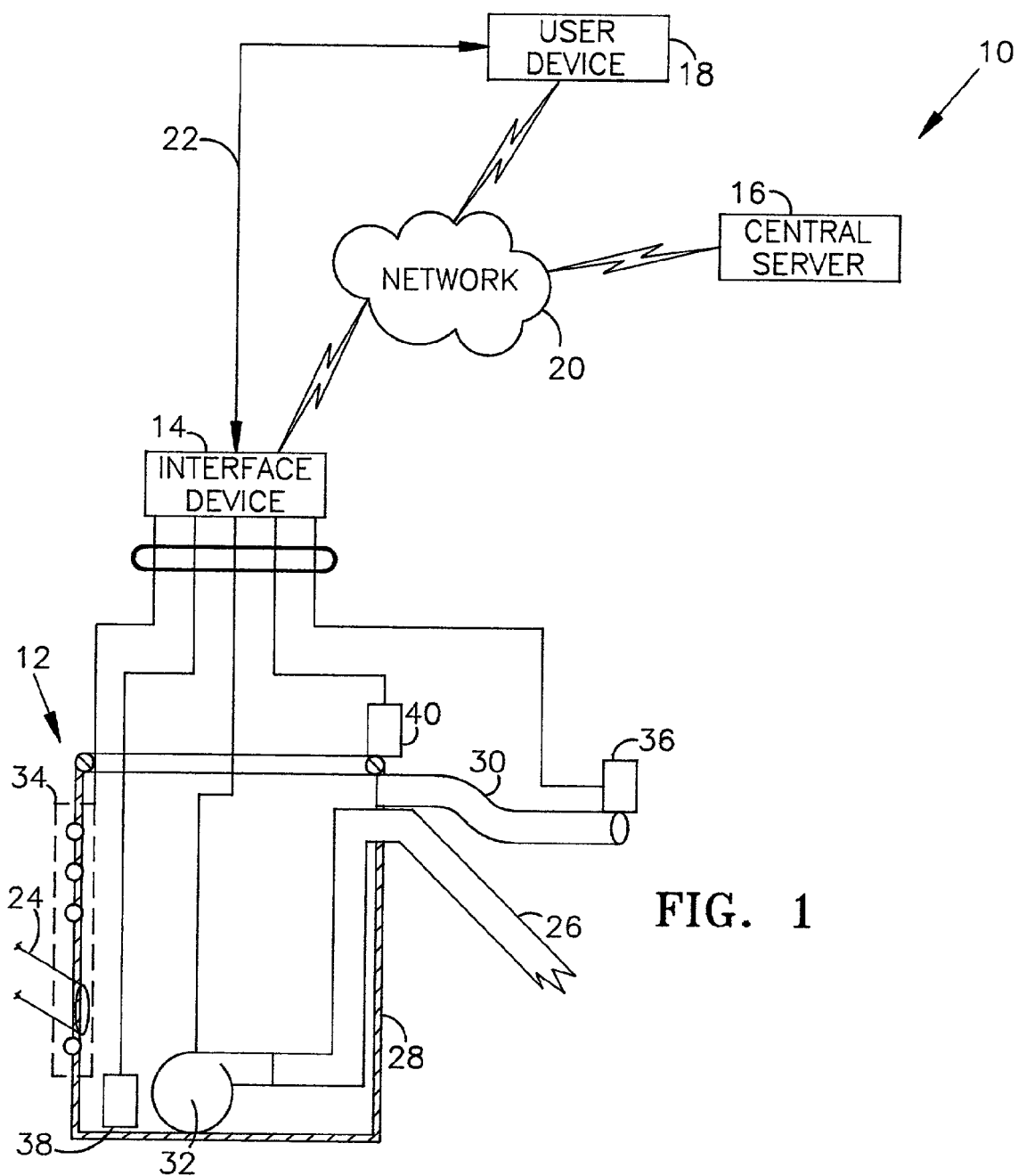
FIG. 1 is a block diagram of one embodiment of a remote monitoring system and a remote site.

FIG. 1 is a block diagram of one embodiment of a remote monitoring system 10 involved in monitoring, recording and controlling parameters associated with a remote site 12. The remote monitoring system 10 includes at least one interface device 14, at least one central server 16 and at least one user device 18 coupled via a network 20 as illustrated. As used herein, the term "coupled," "connected," or "interconnected" may mean electrically coupled, optically coupled, wireless coupled or any other form of coupling providing an interface between systems, devices and/or components.

In the illustrated embodiment, the remote site 12 is represented by a sewage lift station that includes an inlet 24, an outlet 26, a wet well 28, an overflow 30, a pump 32, a level sensor 34, an overflow sensor 36, a pH sensor 38 and a rainfall sensor 40 cooperatively operating in a well-known fashion. In other embodiments, any other equipment may be included in the sewage lift station. In addition, in other embodiments, the remote site 12 may be any other remotely located equipment such as, for example, equipment associated with a gas pipeline station, an electrical distribution station or any other remotely located system and/or device. As further illustrated in FIG. 1, the equipment associated with the remote site 12 may be electrically coupled with the interface device 14 and provide signals indicative of operational parameters thereto.

The interface device 14 may be any device capable of receiving, processing and storing operational parameters provided by equipment associated with the remote site 12. Operational parameters provided to the interface device 14 may be represented by digital inputs, such as, for example, powered or unpowered contact closures and analog inputs such as, for example, 4–20 ma or 1–5V variable signals. Processing within the interface device 14 may include calculation, storage and logical analysis of operational parameters. In addition, the interface device 14 is preferably capable of communicating with the central server 16 and the user device 18 over the network 20.

In the presently preferred embodiments, communication with the central server 16 or the user device 18 includes wireless communication using a first protocol and a second protocol. The first and second protocols may be selectively utilized to minimize wireless airtime when data is communicated between the interface device 14 and the central server 16 or the user device 18. In general, the interface device 14 may be configured by the user to selectively choose either the first or second protocols for communication based on logical analysis of user defined operational conditions. As discussed in detail later, the first protocol is a relatively small exception message that includes a data string. The data string is fully configurable by the user to include whatever operational parameters and other available information the user selects. The second protocol is relatively large datafile message suitable for transmitting larger blocks of data. Accordingly, a user may selectively utilize the first protocol for communication of more frequent but relatively small data transfers and the second protocol for less frequent larger data transfers to minimize wireless airtime.

Configuration of the logical analysis to create operational conditions may be performed by the user(s) based on specification of operating conditions by the user. In the presently preferred embodiments, the user may elect to communicate operating conditions warranting immediate attention using the first protocol. Similarly, the user may elect to communicate operating conditions where data may be accumulated in a datafile using the second protocol.

For example, in the remote site 12 illustrated in FIG. 1, the sewage lift station preferably operates within certain acceptable operating parameters. A user may determine that some of these parameters are more crucial to the operation and/or life span of the equipment than are other parameters. The user, based on this crucial/non-crucial determination may logically specify operational conditions. For example, a low level in the wet well 28 may be less serious than a motor overload condition on the pump 32.

Configuration of exception messages using the first protocol may be based on user specified operational conditions. For example, whenever a piece of equipment operates outside its preferred parameters, a user may elect to logically configure an exception condition and utilize the first protocol to communicate such a condition with an exception message. Similarly, a user may elect to communicate an exception condition when a regularly scheduled event occurs too often, too infrequently, or not at all. In addition, a user may elect to create an exception message for conditions indicative of a measured value being beyond the design specification of the corresponding equipment. Further, a user may elect to create an exception message at predetermined intervals to indicate the operational status of the remote site 12. In the presently preferred embodiments, such exception conditions may be communicated to the central server 16 or the user device 18 with the first protocol in an exception message that includes a user configured message format. The user configured format of the exception message provides operational information related to the exception condition with minimal consumption of wireless airtime.

Non-exception-related operational conditions, on the other hand, such as, for example, the runtime of the pump 32, the draw-down time of the wet well 28, flow, detection of volatile organic compounds (VOCs), etc., may also be important information that may dictate future maintenance or corrective action. A user may determine that such non-exception-related operational conditions may not require the immediate transmission of recorded data, as with an exception condition, and may instead be transmitted more infrequently based on user specified operational conditions. Accordingly, the user may configure the logical analysis of the interface device 14 to communicate such information with the second protocol less frequently based on user specified operational conditions, such as, for example, time of day, volume of data, etc.

In other embodiments, the user may elect to communicate with the second protocol during exception conditions and the first protocol during non-exception-related operational conditions to minimize wireless airtime. As is readily apparent, the criteria for protocol selection is application-specific and completely within the discretion of the user to minimize the use of wireless airtime while optimizing operational information provided from the remote site 12.

Communication between the interface device 14 and the user device 18 may be performed locally as represented by arrow 22 with RS232, RS422, Modbus, Bluetooth, proprietary protocols or any other communication protocol. In addition, remote communication between the interface device 14 and the user device 18 may be performed via the central server 16 over the network 20. Further, communication between the interface device 14 and the user device 18 may be performed remotely over the network 20 without the central server 16. Similar to the protocol selection, communication to and from the interface device 14 is application specific and completely configurable by the user to minimize the use of wireless airtime while optimizing operational information provided from the remote site 12

The central server 16 may be any device capable of communication with the interface device 14 and the user device 18. In addition, the central server 16 may include well-known server functionality such as, for example, security, database management, communications etc. In the presently preferred embodiments, the central server 16 is a server computer operating on the network 20 with access to the interface device 14, the user device 18 and the Internet. As discussed later in detail, the central server 16 includes data storage and administration functions for the remote monitoring system 10. In addition, the central server 16 provides an interface to allow a user to configure, manipulate and direct the operation of the remote monitoring system 10 via the user device 18. In other embodiments, the central server 16 may be any other computing equipment capable of executing instructions to perform the functionality described herein.

The user device 18 may include any number of devices available to one or more users for accessing the remote monitoring system 10. In the presently preferred embodiments, the user device 18 may include wireless devices, wireline devices and devices with both wireline and wireless communication capability for interfacing with the remote monitoring system 10. Exemplary user devices 18 include desktop computers, laptop computers, handheld computers, personal digital assistants (PDAs), wireless telephones, wireline telephones, pagers, facsimile machines or any other device capable of receiving and/or sending data electronically.

Applications operating on the user device 18 may allow communication over the network 20 via, for example, telnet, short message service (SMS), Post Office Protocol (POP), multipurpose Internet mail extensions (MIME), hypertext transfer protocol (HTTP), secure HTTP, point-to-point protocol (PPP), Transmission Control Protocol/Internet Protocol (TCP/IP), Simple Mail Transfer Protocol (SMTP), proprietary protocols or any other protocols known in the art. Similarly, applications operating on the user device 18 may support local communication with the interface device 14 using any of the previously discussed communication protocols. In addition, applications in support of the first and second protocol, user configurations to minimize wireless airtime and other functionality pertaining to the operation of the user device 18 within the remote monitoring system 10 as herein described may also be included.

The network 20 may include public and/or private intranets, extranets, local area networks (LANS) and/or any other forms of network configuration to enable transfer of data and commands. Communication may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data, audio and/or video.

The user may selectively configure the interface device 14 to generate the first protocol with a message format that advantageously includes data indicative of the operational conditions that triggered communication with the first protocol. Accordingly, the user may communicate exception messages with the first protocol to remain abreast of operating conditions the user has logically identified as exception conditions while minimizing wireless airtime. Similarly, the user may selectively configure the interface device 14 to communicate datafile messages indicative of non-exception-related operational conditions with the second protocol.

The interface device 14 may also be configured by the user to selectively communicate with the central server 16 and/or the user device 18 using the first and second protocol. Selection by the interface device 14 of whether to communicate with the central server 16 and/or the user device 18 may be user configured based on application specific considerations. Application specific considerations may include, for example, the use of the first or second protocol, the content of the messages, operational conditions, available communication services, users who should be notified and/or any other application related considerations configured by a user.

During operation, operational parameters associated with the remote site 12 may be monitored and recorded by the interface device 14, such as, for example, operation of pump 32, overflow sensor 36, or any other piece of equipment that may be desired to be monitored. In addition, the interface device 14 may perform calculations with the monitored operational parameters to create additional operational parameters. Periodically, based on user configured operational conditions, such as, for example, elapsed time, the interface device 14 may send an exception message to the central server 16 and/or the user device 18 using the first protocol.

The exception message may be, for example, a status signal to inform the central server 16 and/or the user via the user device 18 that the equipment being monitored and the interface device 14 are functioning correctly. In addition, the interface device 14 may, based on user configured operational conditions, such as, for example, elapsed time, send a datafile message to update a historical file stored within the central server 16 and/or the user device 18 using the second protocol. Further, when a user configured operational condition occurs, the interface device 14 may send an exception message or datafile message to the central server 16 or the user device 18 indicative of current operating conditions related to the user configured operational condition.

As described later, messages sent to the central server 16 may then be routed as an alert message to the user device 18. In response to an alert message from the central server 16 or a message directly from the interface device 14, a user may generate a response message. The response message may be control signals to remotely control equipment associated with the remote site 12, acknowledgment of an alarm condition, or any other communication to the interface device 14 and/or the equipment at the remote site 12. The response message may be transmitted over the network 20 to the interface device 14 to remotely control equipment associated with the remote site 12. The first or second protocol may be used to transmit such a response message.

Figure 2:
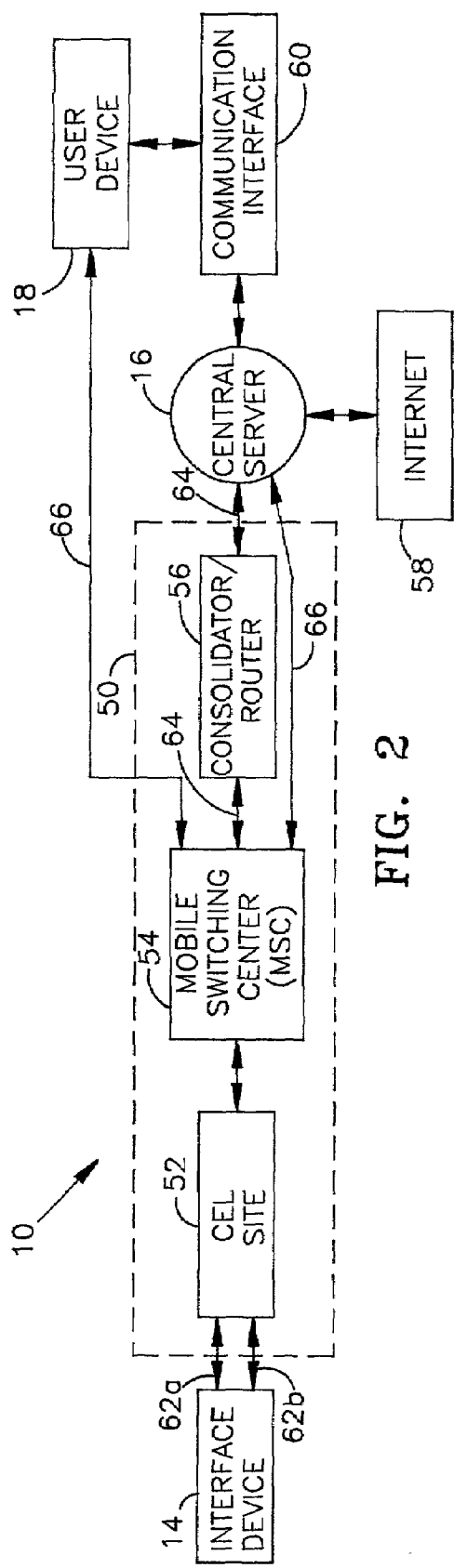
FIG. 2 is a block diagram of one embodiment of network communication paths for the remote monitoring system illustrated in FIG. 1.

FIG. 2 is a block diagram illustrating network communication paths within one embodiment of the remote monitoring system 10. Similar to FIG. 1, the embodiment of FIG. 2 includes the interface device 14, the central server 16 and the user device 18. In this embodiment, the interface device 14 preferably communicates with the central server 16 and/or the user device 18 over a wireless network 50 as illustrated. The wireless network 50 includes a cell site 52, a mobile switching center (MSC) 54 and a consolidator/router 56. Further, the central server 16 includes a network connection with the Internet 58, and with the user device 18 via a communication interface 60 as illustrated. In other embodiments, additional wireless and/or wireline components and systems may be included in the network communication path(s).

In the presently preferred embodiments, the interface device 14 includes functionality to operate similar to a cellular telephone. Accordingly, the interface device 14 is provided with an electronic serial number (ESN) and a mobile identification number (MIN). As in conventional wireless communication, messages to and from the interface device 14 may be transmitted via a radio frequency link 62 to the cell site 52 (e.g., base station) located nearby. The cell site 52 may in turn communicate with the mobile switching center (MSC) 54. The MSC 54 is representative of a wireless network provider, such as, for example, Verizon Wireless™, Cellular One™ or any other wireless network service provider. The MSC 54 preferably communicates with both the user device 18 and the consolidator/router 56. The consolidator/router 56 is representative of communication network providers, such as, for example, Bell South™ Cellemetry, Aeris.net™, etc. The consolidator/router 56 preferably communicates with the central server 16.

As illustrated in FIG. 2, the radio frequency link 62 of this embodiment is depicted as a first radio frequency link 62a and a second radio frequency link 62b. The first and second radio frequency links 62a and 62b are representative of bi-directional communication with the first protocol and the second protocol, respectively. The first radio frequency link 62a may communicate exception messages from the interface device 14 over the wireless network 50 to the central server 16 and/or the user device 18. The second radio frequency link 62b may similarly communicate datafile messages. The central server 16 and the user device 18 may also selectively communicate response messages to the interface device 14 using one of the first and second protocols.

In the presently preferred embodiments, the first radio frequency link 62a may represent bi-directional communication over a control channel of a cellular network or with a transport protocol such as, for example, short message service (SMS), time division multiple access (TDMA), Global System for Mobile-Communications (GSM) or any other packet-based data transport protocol.

In embodiments where the first radio frequency link 62a represents communication over a control channel, the first protocol may be transmitted to the central server 16. Similarly, the first protocol may be communicated from the central server 16 to the interface device 14 with the first radio frequency link 62a representative of a control channel. Transmission of the first protocol over a control channel may occur in a well-known manner within the handshaking communication between the interface device 14 and the cell site 52. In these embodiments, when the interface device 14 detects an exception condition based on user configured operational conditions, an interface to the wireless network 50 is activated. The interface device 14 of this embodiment effectively acts as a cellular telephone in a roaming condition and "attempts" to make a telephone call. Because the interface device 14 is not recognized as being a resident of the local cell site 52, the cell site 52 contacts the "home cell" of the interface device 14 via the mobile switching center 54 to confirm that the interface device 14 is in good standing to complete the "call." In this embodiment, there really is no "home cell;" instead, the services provided in the consolidator/router 56 act as the home cell.

The services of the consolidator/router 56 may be initiated by receipt of the electronic serial number (ESN) of the interface device 14, the multi-digit "phone number" (MIN) assigned to the interface device 14 and/or the multi-digit "phone number" that the interface device 14 is "attempting to call." The consolidator/router 56 may respond to the cell site 52 to confirm that the interface device 14 is in good standing and should not be blacklisted. In addition, the consolidator/router 56 may inform the cell site 52 that the call need not go through, and that the interface device 14 should be removed from the "okay to roam" list.

The interface device 14 is not really trying to call anyone. In one embodiment, the first protocol is embedded within the MIN. In this embodiment, the multi-digit "phone number" attempting to be called represents the user-customized data string of the first protocol. In addition, the multi digit "phone number" assigned to the device interface 14 may also include the user-customized data string of the first protocol. In another embodiment, the ESN of the interface device 14 may include the user-customized data string of the first protocol embedded therein. Accordingly, the data string of the first protocol may be configured by the user to fit within the data packet (e.g., the ESN or MIN). In either embodiment, the MIN and/or ESN are forwarded to the central server 16 by the consolidator/router 56 for processing to extract and normalize the information contained in the first protocol. Response messages from the central server 16 transmitted with the first protocol over a control channel may be similarly processed by the consolidator/router 56 and forwarded to the interface device 14 over the first radio frequency link 62a.

As previously discussed, the format of this embodiment of the first protocol sent over a control channel may be a multi-digit code. The first digit may identify the message format (e.g., status message, alarm message, response message, etc.). For messages from the interface device 14, additional digits may also be reserved for a sub-address to identify the remote site 12 associated with the interface device 14 that is experiencing an exception condition. For example, one interface device 14 may be associated with multiple remote sites 12, all electrically connected with the interface device 14. The remaining digits in the first protocol may be customized by the user to provide operational parameters and other indications of the operating condition which caused generation of the first protocol. Alternatively, the remaining digits may be customized by the user to provide control information, alarm acknowledge information, etc., in a response message from the central server 16. The multi-digit messages may be transmitted via the consolidator/router 56 between the interface device 14 and the central server 16 over control channels as illustrated by arrows 64.

In embodiments where the first radio frequency link 62a represents communication with a transport protocol, the transport protocol preferably encapsulates the first protocol to form a data packet. The interface device 14 may then identify the central server 16 or the user device 18 as the recipient. The first protocol may then be selectively transmitted over the network 20 via the MSC 54 to the central server 16 and/or the user device 18 as illustrated by arrows 66. As previously discussed, selective transmission to the central server 16 and/or the user device 18 may be configured by the user.

Figure 3:
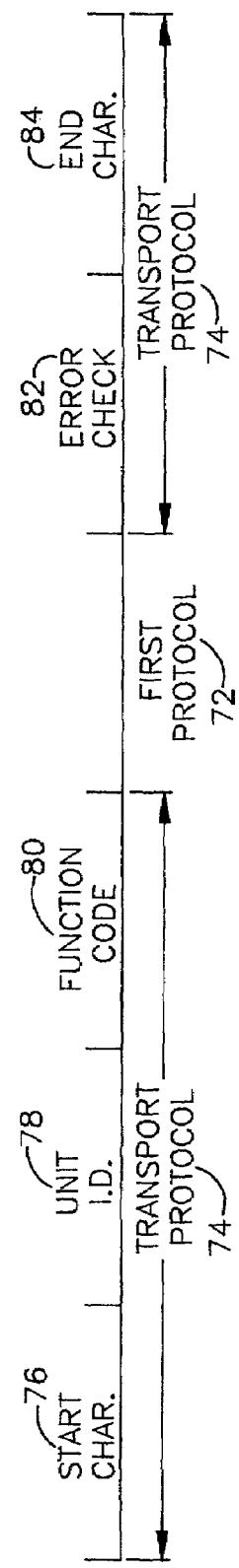
FIG. 3 is a schematic diagram of one embodiment of a datapacket that includes a first protocol over a network communication path illustrated in FIG. 2.

FIG. 3 is a schematic diagram of a data packet 70 illustrating the first protocol 72 encapsulated within an exemplary transport protocol 74. The transport protocol 74 may be represented as a template that encapsulates the first protocol 72 for transmission over the wireless network 50 (FIG. 2) as a data packet 70. The exemplary transport protocol 74 includes a start character 76, a unit ID 78, a function code 80, an error check 82 and an end character 84. The start character 76 indicates the start of the data packet 70, and the unit ID 78 identifies the source from which the transport protocol 74 originated, such as, for example, the interface device 14 (FIG. 1). The function code 80 identifies the type of the data within the transport protocol 74, such as, for example, identification of an exception message. The error check 82 may be used by the transport protocol 74 to verify the integrity of the data packet 70, and the end character 84 identifies the end of the data packet 70. In other embodiments, the template provided by the transport protocol 74 may include additional or fewer parameters with the user-customized first protocol encapsulated therein.

As previously discussed, a user can select the construction of the data string within the first protocol to be any format, down to the organization of every individual binary bit, so long as the first protocol physically fits into the bandwidth of a data packet 70 of the transport protocol 74 (e.g., may be encapsulated by the transport protocol 74 in a single data packet 70). In addition, the user may define any number of different customized data string constructions. The different customized data string constructions may provide exactly the data desired without the inclusion of additional data that undesirably increases the size of the data packet 70 and, therefore, wireless airtime, during transmission of the first protocol. Further, the user may develop logic statements to selectively trigger the use of any of the different customized data string constructions to control the operational information provided with the first protocol.

Due to almost unlimited customization capability by the user, the first protocol may be advantageously configured to conform to almost any size data packet 70. In addition, encapsulation by the transport protocol 74 allows the first protocol to maximize data transport capacity by remaining free of error correction, parity, start/stop characters and other duplicate data. Further, multiple operational parameters may be transmitted in one data packet 70 containing the first protocol, thereby avoiding transmitting operational parameters individually. Since the first protocol is contained in a single data packet 70, timing sequences and other time-based variables which may be subject to unpredictable delays related to wireless transmission have no effect on data integrity and transmission quality. The "off-the-shelf" fully customizable, and, therefore, fully adjustable, nature of the first protocol provides user definable data strings that may be advantageously conformed to meet the needs of a particular remote site 12 (FIG. 1) while minimizing wireless airtime without software code modifications or other special low-level programming.

Figures 4, 5:
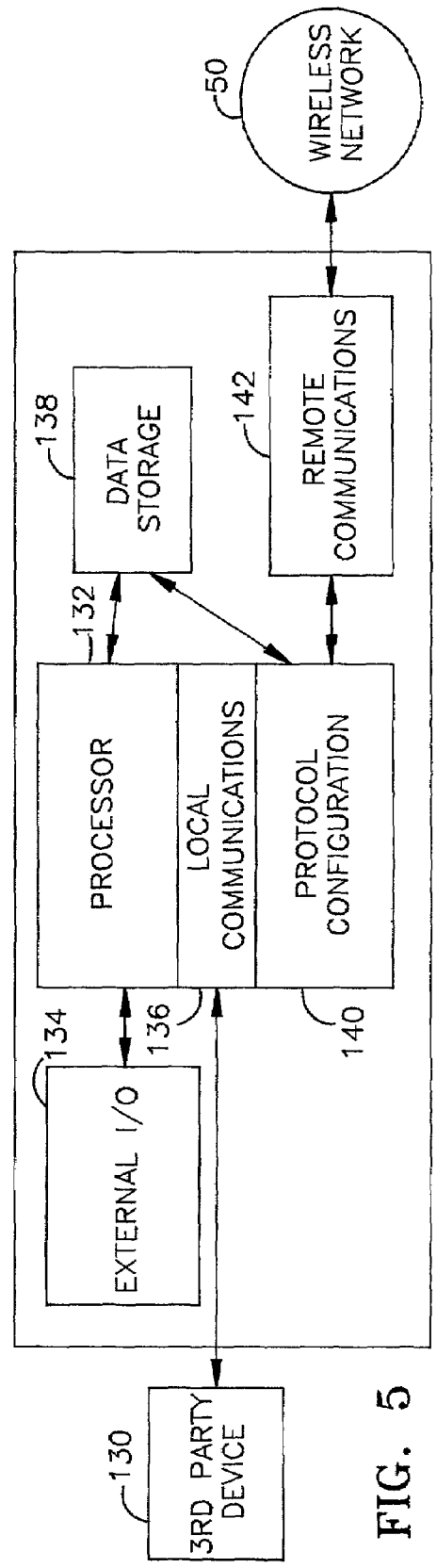
FIG. 4 is one embodiment of a table illustrating a customization template for the first protocol depicted in FIG. 3.
FIG. 5 is a block diagram of one embodiment of an interface device operating in the remote monitoring system illustrated in FIG. 1.

FIG. 4 is a table illustrating one embodiment of a customization template 102 utilized by a user to customize the data string structure(s) of the first protocol. The customization template 102 includes a plurality of rows of operational parameters 104 associated with a logic statement column 106, a min/max scale column 108, an analog resolution column 109, a bit number column 110, an I/O type column 112, a memory location column 114, a string number column 116 and a string structure column 118, as illustrated.

Referring now to FIGS. 1 and 4, each row 104 of the customization template 102 represents one of the operational parameters of the remote site 12 monitored by the interface device 14. The logic statement column 106 identifies a logic statement which triggers the inclusion of the operational parameter identified in an associated row 104 in the customized data string structure. The min/max scale column 108 includes the applicable units of measure in cases where the operational parameter is identified within the I/O type column 112 as an analog output ("AO"), or as an analog input ("AI"). The analog resolution column 109 may be used to define the resolution, and associated number of bits to be represented by an analog variable. Similarly, the bit number column 110 identifies the bit location in the customized data string structure of operational parameters identified as a digital output ("DO") or a digital input ("DI").

The memory location column 114 identifies a contiguous or non-contiguous memory location within the interface device 14 in which the current value of the operational parameter is captured and stored. The string number column 116 identifies the user-customized data string which the operational parameter is part of. The string structure column 118 identifies the structure (or location) of the different operational parameters within a customized data string. In the illustrated example, the letters "A" through "P" each represent individual bit locations in a customized data string of 16 bits. For example, an analog I/O, such as memory location "81302" in FIG. 4 may be represented by the eight bits "A–H," and a digital I/O, such as, memory location "81004" may be represented by one bit "G."

The logic statements may be any logical configuration the user chooses to create user configured operational conditions. In the presently preferred embodiments, simple "if," "then," "else" logic statements may be constructed using the values of operational parameters as well as any other available parameters. Exemplary logic statements pertaining to the customization template 102 illustrated in FIG. 4 are:

LOGIC STATEMENT #1—IF TIME=9:00AM then send STRING#1

LOGIC STATEMENT #2—IF 81004=ON and 32110=OFF or 81302>100 then send STRING #1

Accordingly, "Logic Statement #1" indicates that the first protocol would be sent including the operational parameters identified by the string number column 116 as part of "string #1" when the time is 9:00 am. Similarly, "string #1" would be sent in the first protocol where the memory locations identified in the memory location column 114 met the criteria specified by "Logic Statement #2." For example, the memory location of "81004" may indicate the operational parameter provided by operation of the pump 32, the memory location "32110" may be the operational parameter associated with the overflow sensor 36 and the memory location "81302" may be the operational parameter associated with the level sensor 34. As such, a user-customized data string may be generated and sent by the interface device 14 at 9:00 am and whenever the pump 32 is running, while the wet well 28 is full, and there is no overflow. As is readily apparent, any number and configuration of data strings and logic statements may be configured by a user.

Using traditional communication string theory, this would require the interface device 14 to make four separate requests to different memory locations to retrieve the desired operational data. In the presently preferred embodiments, a plurality of operational parameters may be easily collected and reported in one small customized data packet without the interface device 14 making numerous separate requests or read/writes. In fact, in the illustrated example, there is still room in the customized data string to include additional operational parameters if desired. By allowing the user complete freedom in the ability to create customized data strings and control delivery timing of the first protocol, wireless airtime may be minimized. This is especially the case when wireless networks bill users based upon actual wireless airtime usage, or the number of data packets sent/received. A "standard" or "canned" communications protocol does not provide the flexibility to minimize the number of data transactions by allowing user customization of data strings to minimize wireless airtime while still providing desirable data.

Referring again to FIG. 2, in the presently preferred embodiments, the second radio frequency link 62*b* may represent communication over wireless voice channels. When the interface device 14 is activated by user configured operational conditions to transmit a datafile message using the second protocol, the interface device 14 places a phone call by dialing a predetermined phone number. The predetermined phone number may belong to the central server 16 and/or the user device 18. The interface device 14 may be treated as a roaming wireless telephone, or as a home network wireless telephone depending on the wireless services to which the interface device 14 has been subscribed. Accordingly, wireless airtime charges are applied similar to any other user of the wireless network 50.

The bi-directional communication path over the wireless network 50 between the interface device 14, the central server 16 and/or the user device 18 includes the cell site 52 and the MSC 54. Once the communication path has been established, the datafile messages may be transmitted over the second radio frequency link 62*b* and the respective communication paths indicated by arrows 66. In these embodiments, the interface device 14, the central server 16 and/or the user device 18 may include utilization of an application capable of compressing and then efficiently transmitting compressed data. The application may be resident in the respective device and/or may be located elsewhere in the wireless network 50. The application may be any software application capable of compression and transmission of data. In the presently preferred embodiments, the interface device 14, the central server 16 and/or the user device 18 cooperatively operate with data compression and transmission software owned and operated by the communication network provider, such as, for example, Vburst™ provided by Aeris.net™. The Vburst™ technology allows compression and transmission of datafiles in a manner that minimizes wireless airtime.

A Vburst™ data transmission session may begin with a standard cellular call origination sequence at the interface device 14, the central server 16 and/or the user device 18. A MicroBurst data packet such as, for example, an "*" followed by a dial digits field of 15 to 23 digits that contains device identification numbers destination information, and encryption keys, may be sent from, for example, the interface device 14 to the MSC 54. The data packet may then be forwarded via a signaling system 7 (SS7), for example, to a home location register (HLR) (not shown) for processing. The HLR extracts the data, including the encryption key, from the dialed digits field and provides the information to the consolidator/router 56. At the same time, the MSC 54 may set up a voice channel from, in this example, the interface device 14 to the MSC 54. Via translations within the MSC 54, the interface device 14 of this example may be connected to the consolidator/router 56 via a trunk circuit.

Once connection with the consolidator/router 56 is established, communications between the interface device 14, the central server 16 and/or the user device 18 and the consolidator/router 56 is performed using digital signal processing (DSP) based signal processors. In the presently preferred embodiments, a modified V.27ter modem protocol is used that allows the link to be made without a lengthy modem handshake. In addition, higher layer protocols may be added to provide sophisticated encryption, error correction, error detection, and retransmission. Further, in one embodiment, V.27ter has been modified, and all higher layer protocols have been optimized for Vburst's™ specific type of data delivery.

Although Vburst™ technology has the ability to minimize wireless airtime, the interface device 14 performs processing of the datafiles prior to transmission with the second protocol to further minimize wireless airtime. In addition to allowing the user to designate the ranges of data to be transmitted, the interface device 14 may also include industry specific calculations that automatically record, calculate and organize operational information into compressed data files. For example, a third party device may have a default analog sensor resolution of 12 bits that is not adjustable by the user. It may be completely appropriate to transmit these values as a whole percentage of full scale resolution, as the final application may not require 12 bit resolution accuracy. This would reduce each analog variable size from 12 bits to 7 bits and thus reduce the size of the data transmission. When transmitting thousands, millions, or hundreds of millions of field readings, this reduction in analog data size can significantly reduce the wireless airtime. Accordingly, transmittal of raw, unformatted data requiring recompilation or other later processing in addition to larger amounts of wireless airtime is avoided.

The second protocol may also be utilized by the central server 16 and/or the user device 18 to transmit files, control, and reconfiguration data to the interface device 14 using this same data compaction technique and Vburst™ technology. As such, a user may transmit a response message using the second protocol. In addition, initial configuration, as well as reconfiguration, of the interface device 14 may be downloaded to the interface device 14 with the second protocol. The Vburst™ technique, in conjunction with the application specific compression routines, provides the ability to send and receive relatively large data files while minimizing wireless data delivery time compared to conventional wireless voice channel technologies.

Referring once again to FIG. 2, bi-directional communication between the central server 16 and the user device 18 may be performed using the communication interface 60. The communication interface 60 may include, the Internet, a modem connection, a local area network (LAN), a wide area network (WAN), an intranet, an extranet, a wireless network and/or any other form of wireless and/or wireline communication link(s). Internet access to the central server 16 may be performed with a browser operating on the user device 18 and may involve security safeguards, such as, for example, entry of a user name and password. Other communication mediums that may be utilized with the communication interface 60 include email, text messages, audio messages, video messages and/or any other mechanism for communicating data.

In the presently preferred embodiments, users of the remote monitoring system 10 are provided with an account residing on the central server 16. The account may be accessed with the user device 18 via the communication interface 60. The account is configurable by the user and preferably includes an interface device configuration function, a message profile function and a data storage function.

The interface device configuration function allows a user to fully configure the interface device 14 at the central server 16. Accordingly, set up of the user configured operational conditions, customization of data strings in the first protocol, customization of the datafiles in the second protocol and other operational set up of the interface device 14 may be performed at the central server 16. In one embodiment, the configuration of the interface device 14 may be uniquely identified by the user such that the central server 16 may recognize the interface device 14 during subsequent communications and download the current configuration. Accordingly, an interface device 14 without a configuration may be uniquely identified and then activated to communicate with the central server 16 and download a customized configuration corresponding to the unique identification.

The message profile function involves a message profile that is configurable by users. The message profile may be configured to communicate with the user device 18 in response to predetermined conditions and preferences of the user. In the presently preferred embodiments, the message profile is completely customizable by a user. Customization involves specifications by a user related to the generation, content and transmission of alert messages generated by the central server 16.

Triggers to generate alert messages may be specified by the user with the message profile. For example, a user may specify generation of alert messages in response to operational parameters contained in exception messages and datafiles transmitted from the interface device 14 with the first and second protocols, respectively, to the central server 16 and/or the user device 18. In addition, alert messages may be generated in response to lack of communication with the interface device 14, based on predetermined time schedules or any other variables available to the central server 16.

The user may also configure, as part of the message profile, that different exception messages, datafile messages and/or collected datafiles trigger delivery of alert messages to different individuals at different times of the day, week, month, season, or year based upon user-defined logic conditions. For example, a high priority message may be directed to one repair/maintenance entity during regular business hours, and to a different repair/maintenance entity at night. The repair/maintenance entity may have the ability to immediately initiate corrective action with a response message to remotely control a remote site 12, such as, for example, by starting or stopping a pump 32 (FIG. 1) using his user device 18 and the first or second protocol. Similarly, the same entity could be contacted by a different user device 18 (e.g., fax or cell phone) at different times. The content of the alert messages may also vary as a function of time.

The same alert message may also be sent to a number of other user devices 18 over the Internet and/or utilizing wireless and/or landline connections as configured via the message profile. Preferably, different alert messages may be sent to one or more individual user devices 18 simultaneously, or by user-configured delay, for the same condition. For example, the owner of the remote site 12 (FIG. 1) may receive a less-detailed alert message than the repair/maintenance entity.

In one embodiment, a user may configure the message profile to store messages for delivery at a later time or after certain conditions are met. For example, a repair/maintenance entity may not want his user device 18 activated every time the interface device 14 generates a non-time critical exception or datafile message. Instead, the message profile may be configured to deliver alert messages corresponding to such messages in groups or only after several messages have accumulated. In another embodiment, the message profile may be configured to generate an alert message only after several of the same types of messages are generated by the interface device 14.

The content of the alert messages may also be specified with the message profile. The user may specify that alert messages include operational parameters from the exception and datafiles messages, alarm messages, status information, stored data or any other information available at the central server 16. Accordingly, in addition to problem notification, the message profile may be configured to check in at user-defined intervals with an "all systems okay" message, or to deliver operational parameters collected over an elapsed time period. In addition, the user may configure the message profile to instruct the central server 16 to access an external knowledge base.

The external knowledge base may be any database or other information resource. In the presently preferred embodiments, the user may specify resources available via the Internet 58. For example, with the remote site 12 illustrated in FIG. 1, when an alert message related to pH measured by the pH sensor 38 is constructed by the user, acceptable pH levels may be retrieved from the Environmental Protection Agency (EPA) website and included with the alert. Similarly, an alert message related to the pump 32 may be constructed to include pump curves and other operational information retrieved from the website of the pump manufacturer.

The user may further configure the message profile by specifying the user device 18, such as, for example, fax, pager, e-mail, personal communication service (PCS), personal digital assistant, telephone, etc. to which the message should sent. For example, the message profile may be configured such that multiple individuals may be alerted to an exception condition, the status of equipment history or collected external knowledge base data. All of this data may be specified in the message profile. For example, both a repair/maintenance entity and the owner of a remote site 12 (FIG. 1) that is a sewage lift station may receive an alert message if there is a high wet well 28 (FIG. 1) condition; however, perhaps only one of them may be notified if a power failure occurs.

In other embodiments, much of the functionality of the central server 16 may instead reside in the interface device 14. In these embodiments, for example, the message profile and associated functionality may reside in the interface device 14. Accordingly, exception and datafile messages may be further processed by the interface device 14 as a function of the message profile. As such, exception and datafile messages transmitted directly to the user device 18 may instead be generated as alert messages by the interface device 14 based on the previously described functionality of the central server 16.

FIG. 5 is a block diagram of one embodiment of the interface device 14 coupled with at least one third-party device 130 and the wireless network 50. The interface device 14 includes a processor 132, an external I/O module 134, a local communications module 136, a data storage module 138, a protocol configuration module 140 and a remote communications module 142 coupled as illustrated. In other embodiments, fewer or greater numbers of modules may be included to illustrate the functionality of the interface device 14.

The processor 132 may be a microprocessor, a microcontroller or any other form of intelligent digital processing mechanism capable of performing logic based decisions and directing the operation of the interface device 14. In the presently preferred embodiments, the processor 132 is a microcontroller made by MicroChip Technology™ of Chandler, Ariz. The processor 132 is operable to interface with and direct the remaining modules in the interface device 14.

The external I/O module 134 transmits and receives electrical signals representative of the operational parameters of the equipment associated with the remote site 12 (FIG. 1). The electrical signals may include, for example, discrete signals, contact closures, analog signals, pulse signals or any other form of electrical signal. Conversion, scaling and processing of the electrical signals may be performed by the external I/O module 134. The processor 132 reads and writes to the external I/O module 134 to collect operational parameters and control the operation of the remote site 12 (FIG. 1). Similarly, the processor 132 may also read and write data to the third-party device 130 via the local communications module 136.

The third-party device 130 may be the previously discussed user device 18 (FIG. 1) in local communication with the interface device 14. In other embodiments, the third-party device 130 may be any other intelligent device(s) associated with the remote site 12 (FIG. 1) capable of communicating with the processor 132. Communication between the third-party device 130 and the processor 132 may be performed with the local communications module 136 using any protocol such as, for example, RS232, RS422, MODBUS, Profibus, Ethernet, proprietary protocols, or any other communication protocol.

In addition, to communication with the processor 132, the third-party device 130 may advantageously utilize the first and second protocols within the interface device 14 to communicate with the central server 16 and/or the user device 18. Accordingly, the user may configure data strings within the first protocol to include I/O associated with the third-party device 130. The second protocol may be similarly configured to include datafiles communicated to and/or from the third party device 130. As such, the third-party device 130 may advantageously be remotely monitored and controlled to minimize wireless airtime utilizing the remote monitoring system 10 (FIG. 1).

Remote control of the third-party device 130 may be performed based on transmittal of previously described response messages by either the central server 16 or the user device 18 to the interface device 14. The response messages may be passed by the interface device 14 to the third-party device 130 for further processing. In addition, where needed, the interface device 14 may configure or otherwise translate such response messages into a language/code compatible with the third-party device 130.

Remote monitoring of the third-party device 130 may include the storage of data obtained from the third party device in the interface device 14, the central server 16 and/or the user device 18. Data obtained from the third party device 130 may similarly be translated by the interface device 14 if needed. In other embodiments, a plurality of third party devices 130 may be remotely monitored, controlled and recorded by the remote monitoring system 10 to minimize wireless airtime.

The operating parameters received by the interface device 14 may be processed and stored in the data storage module 138. The data storage module 138 may be any form of storage mechanism with read and write capability. In addition to operating parameters, the configuration of the interface device 14 may also be stored in the data storage module 138. Further, in other embodiments, the message profile, the user account and any other user related information may be stored in the data storage module 138.

The protocol configuration module 140 may access the data storage module 138 to perform logical analysis of the operational parameters. Based on logical analysis of user specified operational conditions, the protocol configuration module 140 may determine whether to use the first or second protocol. In addition, the protocol configuration module 140 may, based on the analysis and conditions, selectively build the user configured data strings of the first protocol and the datafiles of the second protocol. Further, the protocol configuration module 140 also perform processing to extract and normalize the information contained in response messages sent from the central server 16 and/or the user device 18 with the first protocol or the second protocol.

The remote communications module 142 may be any form of wireless communication mechanism communicating over the wireless network 50 with the central server 16 or the user device 18 using any of the previously discussed communication protocols. In addition, in some embodiments, the remote communication module 142 in conjunction with the processor 132 may utilize the message profile stored in the data storage module 138 to transmit messages based on user configured parameters.

Figure 6:
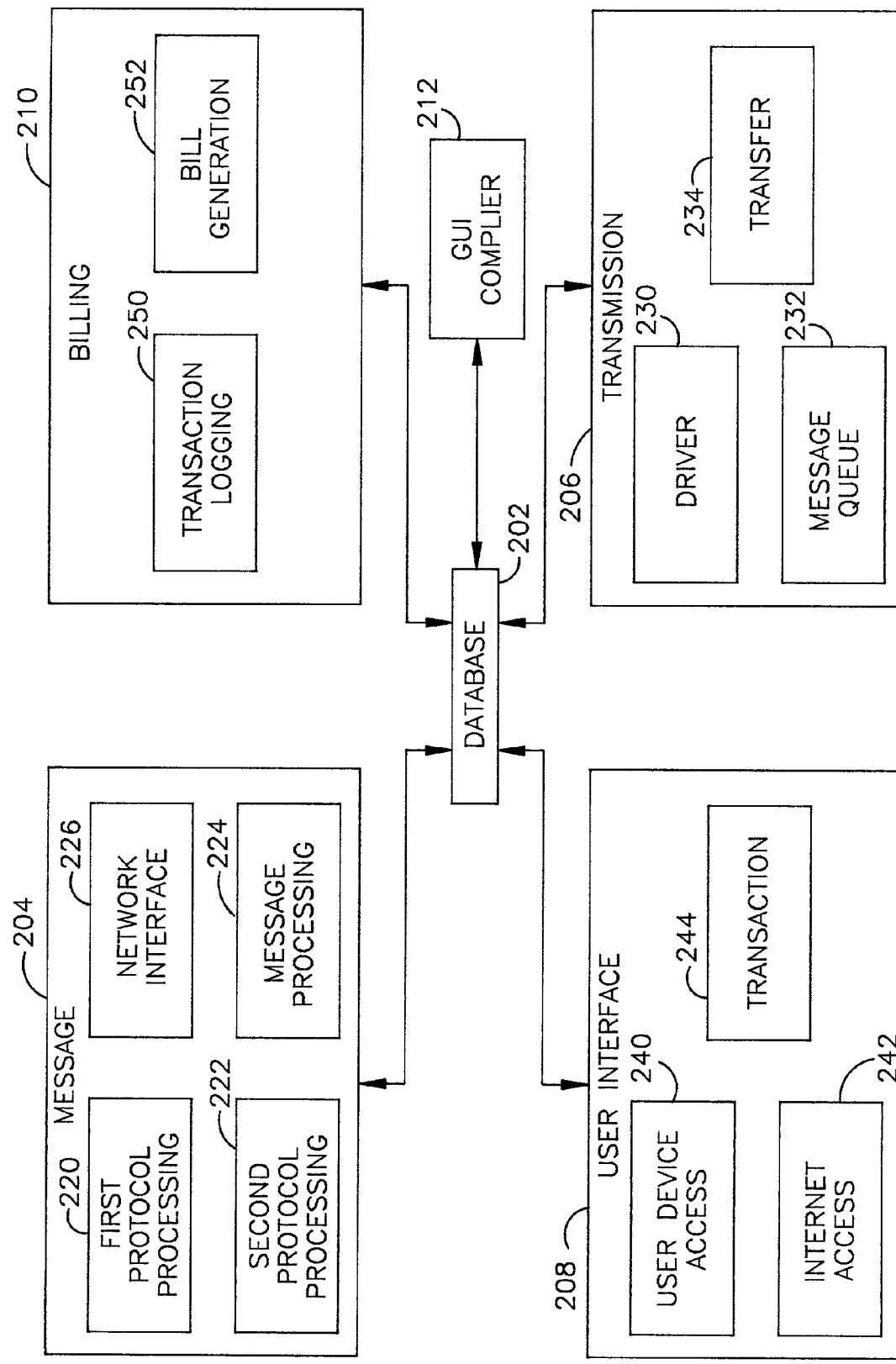
FIG. 6 is a block diagram of one embodiment of a central server operating in the remote monitoring system illustrated in FIG. 1.

FIG. 6 illustrates a block diagram of one embodiment of the central server 16. The central server 16 includes a database module 202, a message module 204, a transmission module 206, a user interface module 208 and a billing module 210 and a graphical user interface (GUI) complier module 212. In other embodiments, fewer or additional modules may be depicted to represent the functionality of the central server 16.

Referring now to FIGS. 1, 2 and 6, the database module 202 is preferably a relational database that forms the core of the central server 16. The database module 202 may store all the operational information communicated to the central server 16 by the interface device 14. In addition, the database module 202 may store the user account, message profile, accumulated messages and any other information related to user interaction with the remote monitoring system 10 (FIG. 1). Further, the database module 202 may be utilized by the other modules of the central server 16 for storage of, and access to, related data.

The message module 204 is responsible for sending and receiving messages, processing them in accordance with the user's preferences and routing them for output to the user device 18 or the interface device 14. In addition, the message module 204 may direct the temporary storage or accumulation of alert messages before transmittal to the user if the user's message profile is set up accordingly. The illustrated message module 204 includes a first protocol-processing component 220, a second protocol-processing component 222, a message processing component 224 and a network interface component 226.

The first protocol-processing component 220 processes exception messages from the interface device 14 communicated using the first protocol. In addition, the first protocol-processing component 220 may embed response messages within the first protocol for transmission to the interface device 14. Accordingly, the first protocol-processing component 220 preferably includes capability to process the first protocol transmitted over a control channel as previously discussed. In addition, capability for processing of transport protocols, such as, for example, SMS, is also preferably included in the first protocol-processing component 220 to extract the first protocol.

The second protocol-processing component 222 similarly includes capability to process datafile messages transmitted with the second protocol. In addition, the second protocol-processing component 222 cooperatively operates with the compression and transmission software applications to process datafile messages. In the presently preferred embodiments, the second protocol-processing component 222 includes Vburst-processing capability. Messages including the second protocol that are processed by the second protocol-processing component 222 include datafile messages from the interface device 14 and response messages directed to the interface device 14.

In other embodiments, any other form of protocol-processing components may be included in the message module 204 to accommodate any other data transmittal mediums utilized by the interface device 14.

Messages may be compressed, decompressed and normalized at the message-processing component 224. In addition, incoming messages from the interface device 14 are passed to a normal message subroutine within the message-processing component 224. The normal message subroutine may store the information from the incoming messages in the database module 202. In addition, the normal message subroutine may access the message profile of the user(s) and, if specified, route incoming messages to the transmission module 206 for further processing and generation of alert message(s).

The message-processing component 224 may also include a missing message subroutine. The missing message subroutine compares received exception messages with a predetermined list of expected exception messages, such as those exception messages providing status of an interface device 14. Generation of an error message may be initiated by the missing message subroutine for exception messages that are expected and not received. The error messages may be delivered to the user device 18 based on the user's message profile.

The network interface component 226 may provide capability to receive messages from analog modems, wireless networks, the Internet, a LAN, a WAN, an intranet, an extranet or any other communication mechanism. Upon receipt of incoming messages, the network interface component passes such messages to the first or second protocol processing modules 220, 222.

In the presently preferred embodiments, the network interface component 226 may receive incoming messages over the network 20 (FIG. 2) from the interface device 14. Incoming messages from the interface device 14 may include the first or second protocol. In addition, the network interface component 226 may also receive an incoming message that is a response message from a user of the user device 18 in response to an alert message. The response message may include remote control instruction(s), an alarm acknowledgement, etc. for the remote site 12 identified in the alert message.

The user may configure the message profile to identify whether such response messages should be forwarded to the corresponding interface device 14 with the first protocol or the second protocol based on, for example, minimization of wireless airtime. In another embodiment, selection between the first and second protocol may be performed by the network interface component 226 based on the amount of information. Where the amount of information will fit, the first protocol is used; otherwise, the second protocol is used.

The network interface component 226 may pass such response messages to the first or second protocol-processing component 222 for generation of a response message to the corresponding interface device 14. Response messages may be transmitted to the interface device 14 using the first or second protocol and the network interface component 226.

The transmission module 206 may include capabilities for transmitting alert messages to the user device(s) 18. The transmission module 206 includes a driver component 230, a message queue component 232, and a transfer component 234. The driver component 230 may include various drivers and a text-to-speech engine for transmitting the various alert messages to the user device(s) 18. The message queue component 232 may be a buffer for temporary storage of alert messages. The transfer component 234 may direct the operation of the driver component 230 and the message queue component 232 based on the message profile developed by a user.

Alert messages to be delivered to a user device 18 may be buffered in the message queue component 232. As message traffic permits, the appropriate drivers from the driver component 230 and messages from the message queue component 230 may be selected and routed over the appropriate communication channels by the transfer component 234. For example, the drivers may be utilized to send numeric pages, faxes, voice and/or data tone multiple frequency (DTMF) messages over a public switched telephone network (PSTN) to a user device 18 using wireline and/or wireless communication channels. Similarly, an email driver may be utilized to send e-mail over the Internet to a user device 18.

When a driver or text-to-speech engine has successfully delivered an alert message, a record may be created in the database module 202 by the transfer component 234 indicating time and date of successful delivery. Undeliverable messages may be routed by the transfer component 234 to the message-processing component 224 to initiate generation of undeliverable alert message errors.

The user interface module 208 enables users to access the central server 16 via the user device(s) 18. As previously discussed, such access may be via a browser over the Internet and/or direct access via wireline and/or wireless networks. The user interface module 208 may provide account access as well as the capability to create and/or edit message profiles residing in the database module 202. The user interface module 208 includes a user device access component 240, an Internet access component 242 and a transaction component 244.

The user device access component 240 may include applications to allow interface by the user device 18 via analog modems, wireless networks, the Internet, a LAN, a WAN, an intranet, an extranet and/or any other communication mechanism. Through the user device access component 240, a user may access, edit and manipulate any information associated with the user's account, such as, for example, the message profile, interface device 14 configurations, information stored in the database module 202 as well as operational characteristics of the other modules in the central server 16.

The Internet access component 242 may allow users to connect via the Internet 58 to a knowledge base resource as previously discussed. In addition, the central server 16 may access the knowledge base resources via the network interface component 242 to generate an alert message based on the message profile developed by a user. The transaction component 244 may monitor requests to alter the user's data as a security function to protect both the integrity and security of the database module 202. Modifications to the user's data may be captured and submitted by the transaction component 244 to the billing module 210.

The billing module 210 includes capabilities to track the charges and fees associated with a user's use of the remote monitoring system 10. The illustrated billing module 210 includes a transaction-logging component 250 and a bill generation component 252. All messages and transactions that pass through the remote metering system 10 may be logged by the transaction-logging component 250. The transaction and message logs may be stored in the database module 202 by the transaction-logging component 250. The billing-generation component 252 may utilize the stored transaction and message logs to generate a dynamic bill for each user. The dynamic bill is an ongoing bill providing a summary of past activity and associated charges.

The GUI complier module 212 may provide a graphical user interface (GUI) that allows the user to configure the interface device 14, access the account, view data and otherwise view, manipulate and edit an information associated with the user account. In the presently preferred embodiments, the GUI complier module 212 is a web-based application capable of operating in a browser. With the GUI complier module 212 the construction of the data strings in the first protocol and associated logic statements, the user configuration of the second protocol and any other user configuration may be easily defined.

In addition, the GUI complier module 212 has the ability to download to the interface device 14 a user configured configuration of the interface device 14 via the network 50 (FIG. 2). Further, the GUI complier module 212 can send user configured information, or any other user specified information to any user defined location within the network 20 (FIG. 1) via, for example, e-mail. In one embodiment, an e-mail containing a complied configuration of an interface device 14 may be generated with the GUI complier module 212 as an executable and sent to a user specified location using the transmission module 206. The configuration may be copied into a terminal emulation program operating in the third party device 130 (FIG. 5) such as, for example, ProComm™ or Hyperterminal™, and then loaded into the interface device 14 via the local communications component 136 (FIG. 5) as previously discussed.

Figure 7:
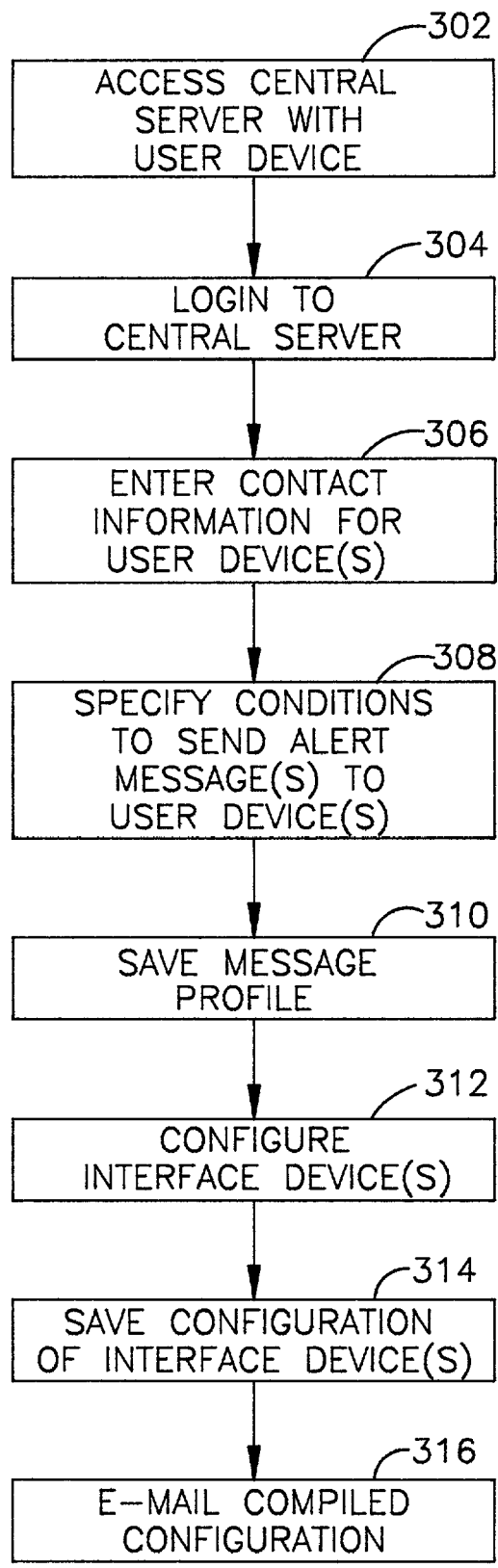
FIG. 7 is a flow diagram illustrating configuration of the interface device depicted in FIG. 5 via the central server depicted in FIG. 6.

FIG. 7 is a flow diagram illustrating one embodiment of initial configuration of the remote monitoring system 10 with reference to FIGS. 1–6. When a user first subscribes, he receives an account. The account may be accessible via the central server 16 using identifying information such as, for example, a user name, password and an account number. The operation begins at block 302, when the user accesses the central server 16 with a user device 18 via the user device access component 240. At block 304, the user logs in by entering identifying information and is provided access to a personal account. The user is then prompted by the central server 16 to enter contact information such as, for example, pager numbers, cellular telephone numbers, facsimile machine numbers, Internet addresses, etc. into a message profile at block 306. The contact information identifies user devices 18 of any individuals who are to be contacted by the remote monitoring system 10.

At block 308, the user may further configure the message profile by specifying exception and datafile messages as well as other operating conditions under which an alert message (s) should be selectively sent to one or more of the previously identified user devices 18. In addition, the message profile may be configured to selectively notify any of the user devices 18 of the status of datafile messages, recorded operational data and/or data collected from the knowledge bases. The message profile may be saved in the database module 202 at block 310.

The user may configure one or more interface devices 14 at block 312. The configuration of each interface device 14 includes uniquely identifying each interface device 14, customizing the first and second protocols, developing the logic strings, mapping I/O for the associated remote site 12, etc. At block 314, the configuration of each interface device 14 may be stored in the database module 202. In addition, the configuration may be sent as a compiled configuration file to any user defined location via e-mail at block 316.

Figure 8:
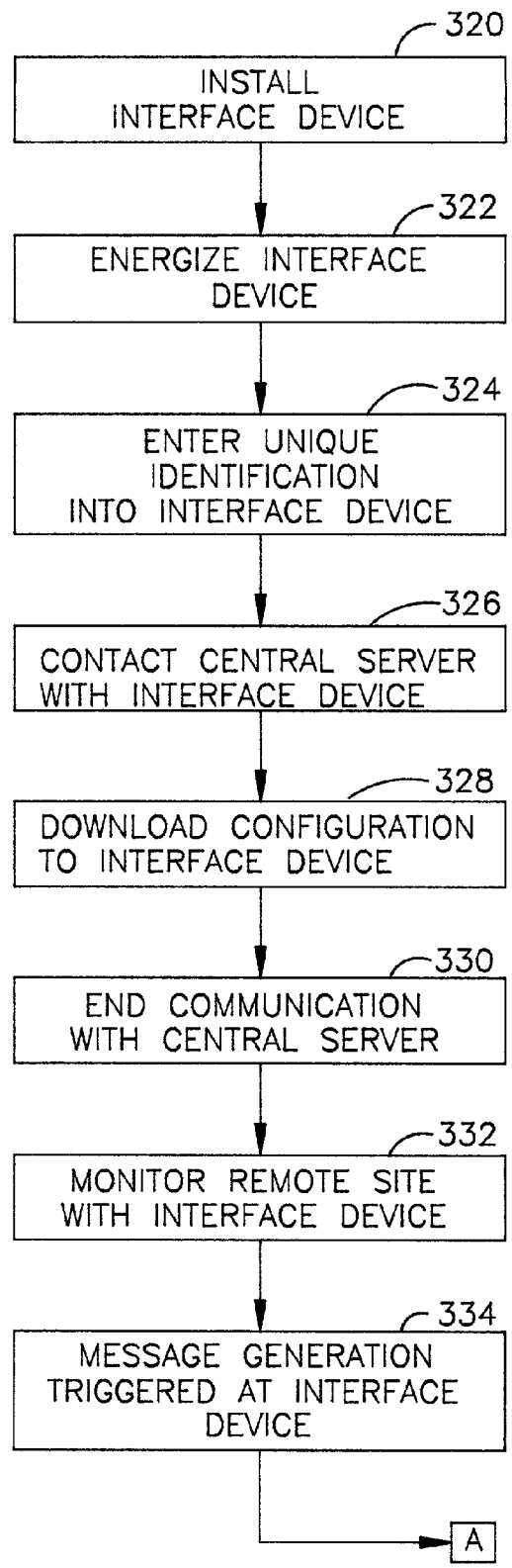
FIG. 8 is a flow diagram illustrating operation of one embodiment of the interface device depicted in FIG. 5.

FIG. 8 is a process flow diagram illustrating operation of one embodiment of the interface device 14 with reference to FIGS. 1, 2 and 5. The user has previously configured the central server 16 and saved a configuration for the interface device 14 as previously discussed with reference to FIG. 7. The operation begins at block 320, when the interface device 14 is installed and electrically connected with the remote site 12. At block 322, the interface device is energized. The local communications component 136 and the user device 18 may be utilized to enter unique identification into the interface device 18 at block 324.

At block 326, the interface device 14 may operate as a cellular telephone using the remote communication component 142 to contact the central server 16 via the wireless network 50 using a voice communication channel. The central server 16 may download the previously configured configuration of the interface device 14 over the voice communication channel with the first or second protocol based on the unique identification at block 328. At block 330, the interface device 14 may end communication with the central server 16. The interface device 14 begins monitoring the remote site 12 and storing operational parameters in the data storage module 138 based on the configuration at block 332. At block 334, operational parameters trigger the interface device 14 to generate a message based on user specified operational conditions configured by the user.

Figure 9:
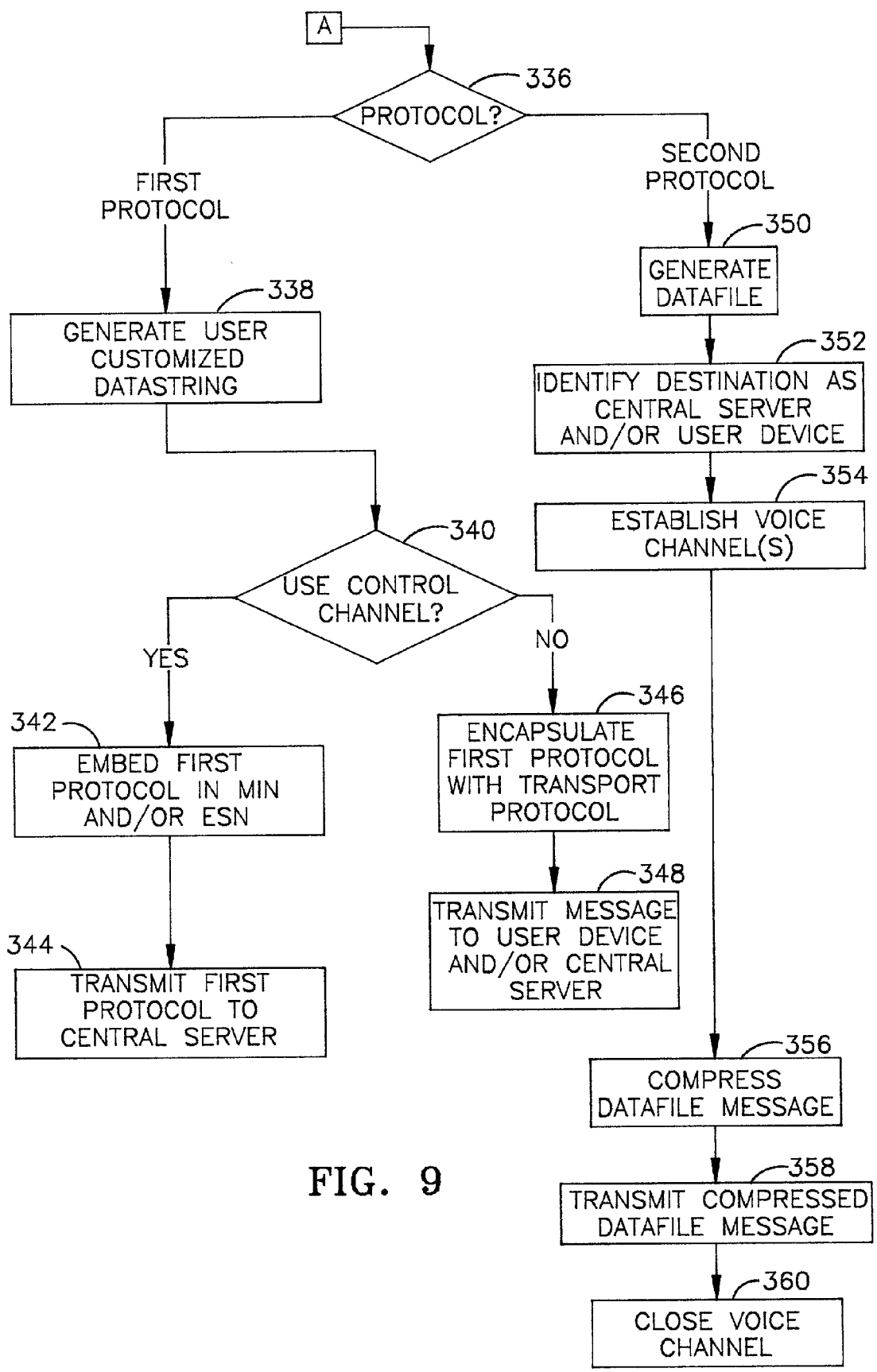
FIG. 9 is second portion of the flow diagram illustrated in FIG. 8.

Referring now to FIG. 9, the protocol configuration module 140 selects whether the message should be an exception message generated with the first protocol or a datafile message generated with the second protocol at block 336. As previously discussed, determination of whether to use the first or second protocol is based on operational parameters and associated logic statements created by the user to minimize wireless airtime. If the first protocol is used for the message, operational parameters previously specified by the user are gathered by the protocol configuration module 140 to generate a user-customized data string forming the first protocol at block 338.

At block 340, the protocol configuration module 140 determines if the first protocol should be transmitted over a control channel of the wireless network 50. If yes, the first protocol is embedded in the ESN and/or MIN at block 342. At block 344, the first protocol is transmitted over the wireless network 50 to the central server 16 by the remote communications component 142. If the first protocol is not transmitted over a control channel, the protocol configuration module 140 encapsulates the first protocol with a transport protocol at block 346. At block 348, the interface device 16 identifies the destination for the exception message as specified by the user and transmits the message with the remote communications component 142 to the central server 16 and/or the user device 18 over the wireless network 50.

If at block 336 the second protocol is selected, the protocol configuration module 140 generates a datafile with a user specified range of data stored in the data storage module 138 at block 350. At block 352, the interface device 16 identifies the destination for the datafile message as the central server 16 and/or the user device 18. The remote communication component 142 establishes voice communication channel(s) with the central server 16 and/or the user device 18 at block 354. At block 356, the interface device 14 cooperatively operates with the compression and transmission software to compress the datafile message. The compressed datafile message is efficiently transmitted to the central server 16 and/or the user device 18 at block 358. At block 360, the interface device 14 closes the voice communication channel(s) when the datafile message is successfully transmitted.

Figure 10:
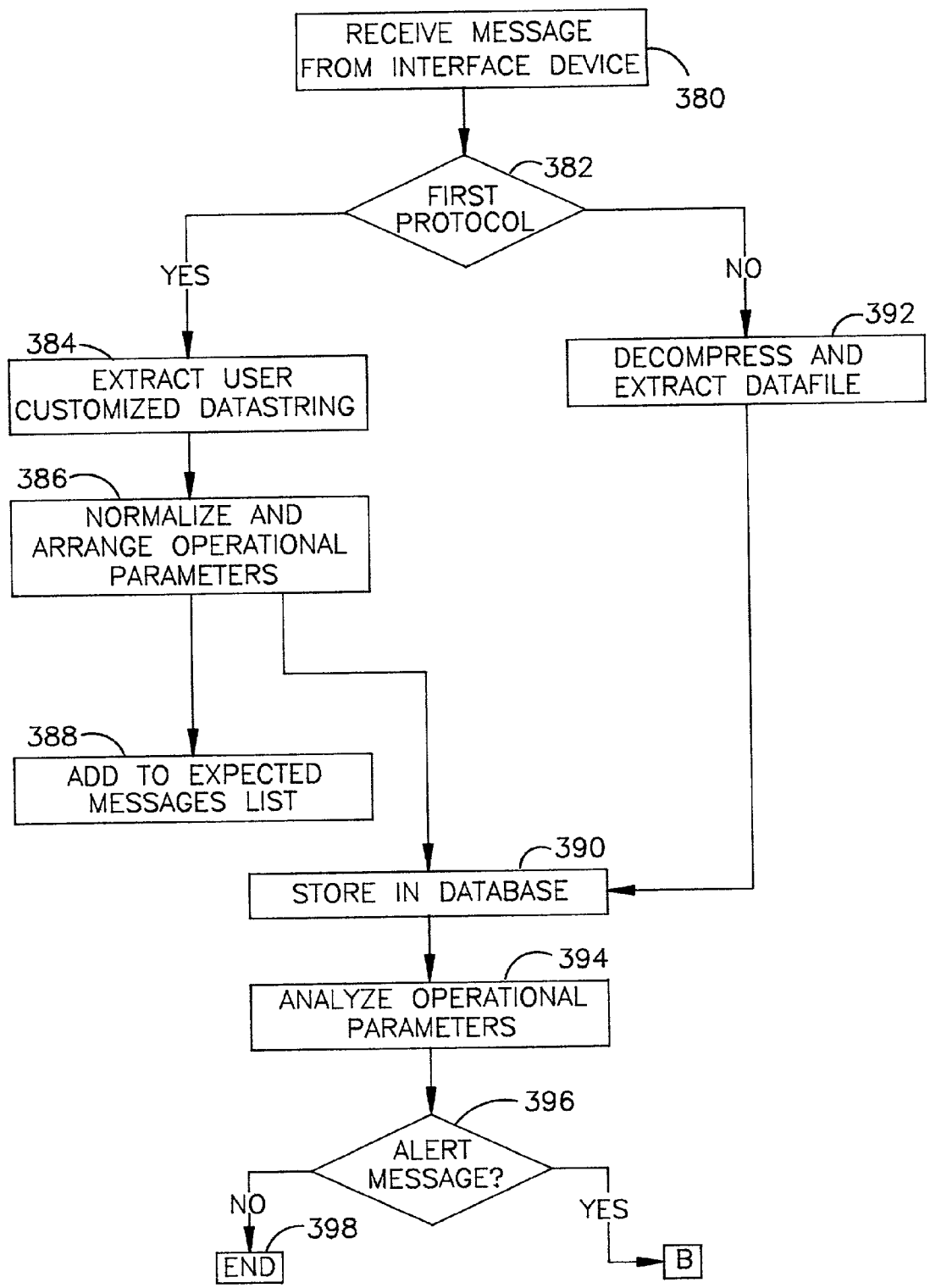
FIG. 10 is a flow diagram illustrating operation of one embodiment of the central server depicted in FIG. 6.

FIG. 10 is process flow diagram illustrating operation of the central server 16 when a message is received from the interface device 14. The operation begins at block 380, when an incoming message is received from the interface device 14. At block 382, the network interface component 226 determines if the message is an exception message communicated with the first protocol. If yes, the first protocol-processing component 220 extracts the user-customized data string from the first protocol at block 384. At block 386, the operational parameters are removed from the incoming message and arranged in a normalized format by the message-processing component 224. The message-processing component 224 adds the exception message to a received exception message list at block 388. In addition, at block 390, the message-processing component 224 stores them as a record in a table in the database module 202.

If the message does not include the first protocol at block 226, the message is a datafile message and the datafile is decompressed and extracted by the second protocol-processing component 222 from the second protocol at block 392. At block 390, the operational parameters from the datafile are stored as records in the database module 202. The message-processing component 224 analyzes the operational parameters in the message based on the user-defined message profile stored in the database module 202 at block 394. At block 396, the message-processing component 224 determines if an alert message should be generated based on the message profile. If not, the operation ends at block 398.

Figure 11:
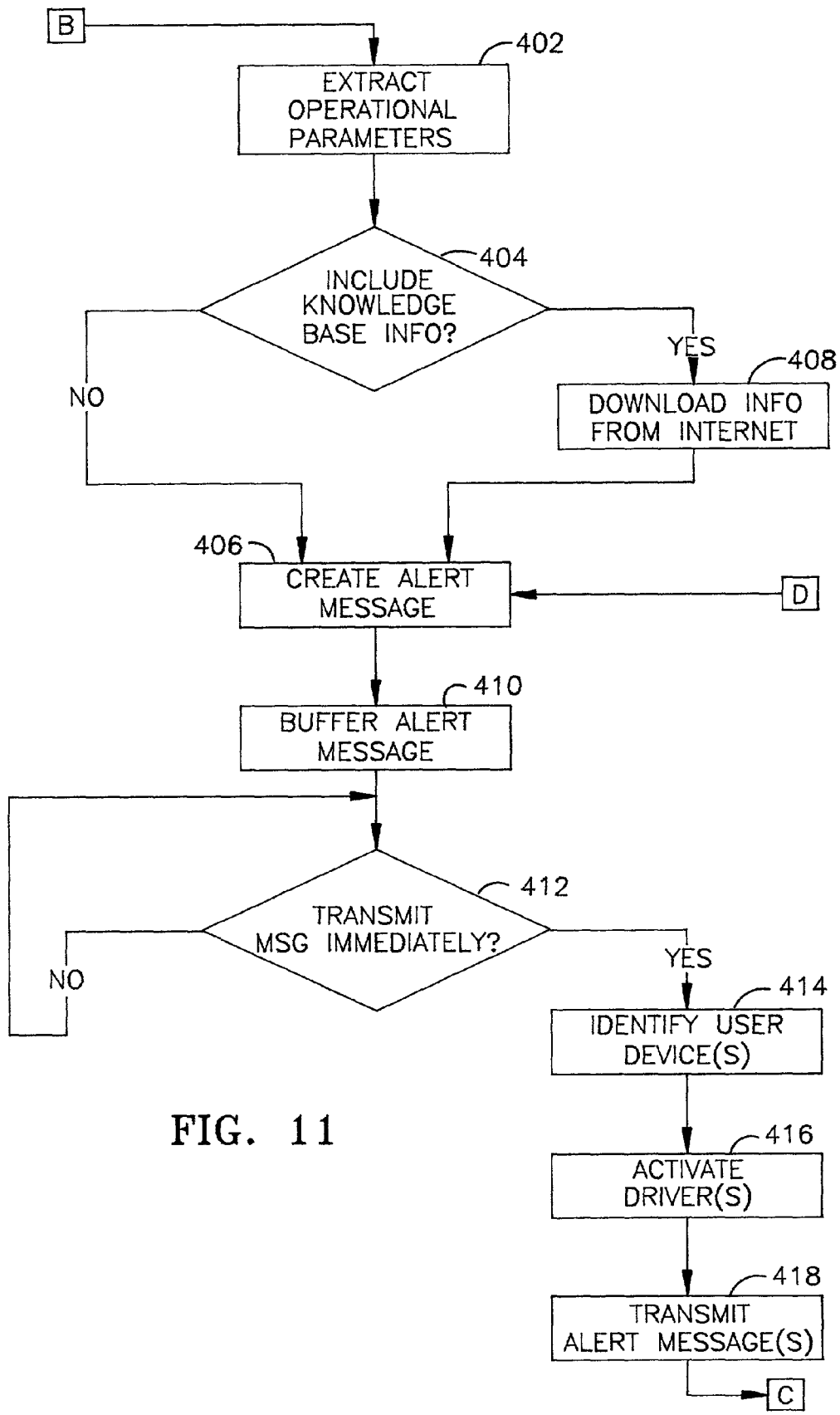
FIG. 11 is a second portion of the flow diagram illustrated in FIG. 10.

Referring now to FIG. 11, if an alert message should be generated, the message-processing component 224 extracts operational parameters from the database module 202 that are specified in the message profile at block 402. At block 404, the message-processing component 224 determines if the message profile specifies information from a knowledge base resource should be included in the alert message. If no, the message-processing component 224 compiles the gathered information to form an alert message at block 406. If yes, the message-processing component 224 accesses the knowledge base resource via the Internet access component 242 and downloads the previously specified information from the Internet at block 408, and then forms the alert message at block 406.

At block 410, the message-processing component 224 buffers the alert message in the message queue component 232. The transfer component 234 determines if the alert message should be transmitted immediately based on the message profile at block 412. If no, the alert message remains stored in the message queue component 232 and the operation returns to block 412. If yes, the transfer component 234 identifies user device(s) 18 designated by the message profile to receive the alert message at block 414. At block 416, the transfer component 234 activates corresponding driver(s) for the identified user device(s) 18. The drivers transmit the alert messages to the user devices at block 418.

Figure 12:
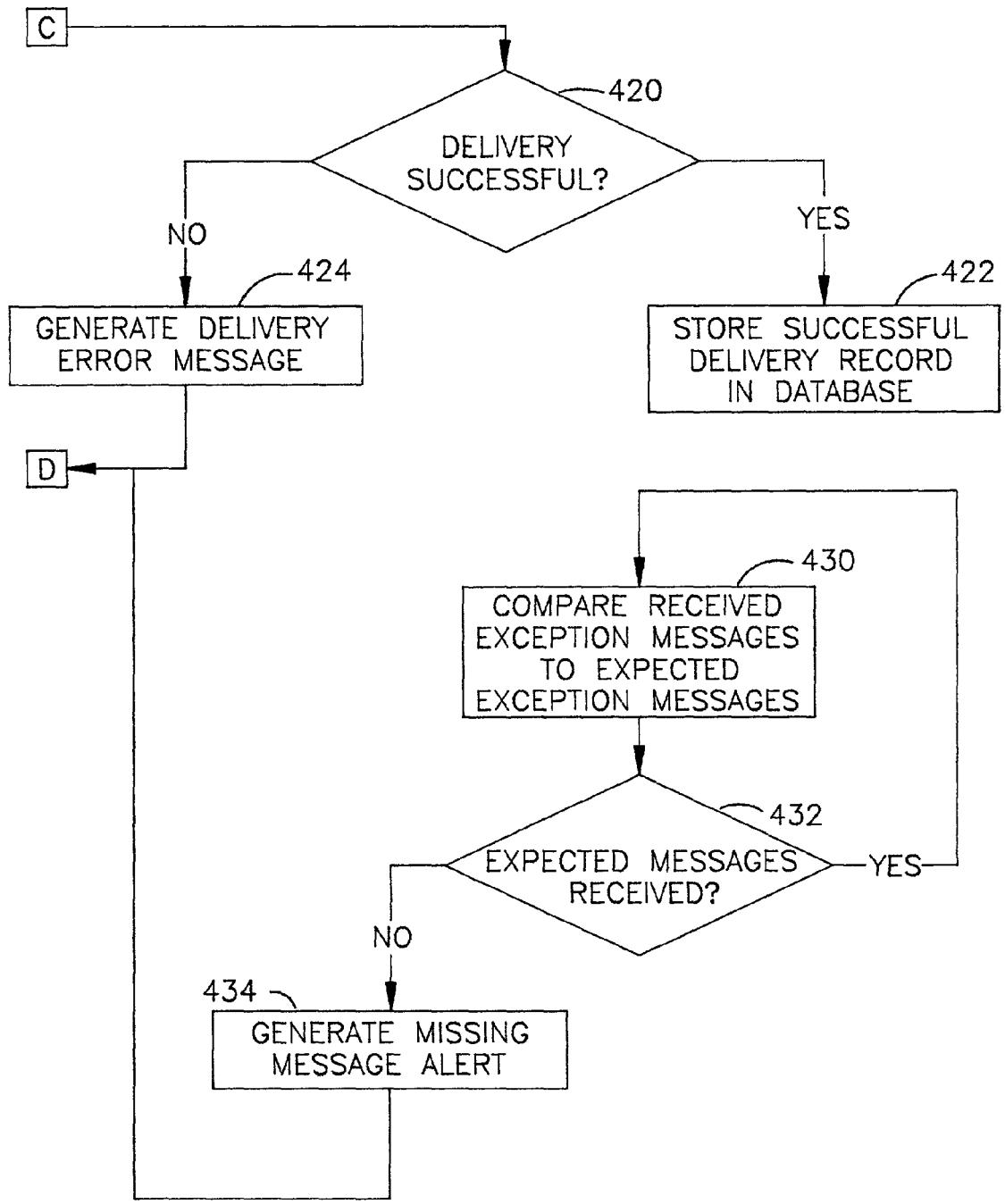
FIG. 12 is a third portion of the flow diagram illustrated in FIG. 10.

Referring now to FIG. 12, at block 420, the transfer component 234 determines if the delivery was successful. If yes, the transfer component 234 creates a record in the database module 202 so indicating at block 422. If no, the transfer component 234 generates an undeliverable error message to the message-processing component 224 at block 424 and the operation returns to block 406 (FIG. 11).

At block 430, the message-processing component 224 compares the received exception message list compiled at block 388 (FIG. 10) to a list of expected exception messages stored in the database module 202. The message-processing unit 224 determines if all exception messages that were expected to be received were actually received at block 432. If yes, the operation returns to block 430. If no, the message-processing component 224 generates a missing message alert at block 434. The operation then returns to block 406 (FIG. 11).

Figure 13:
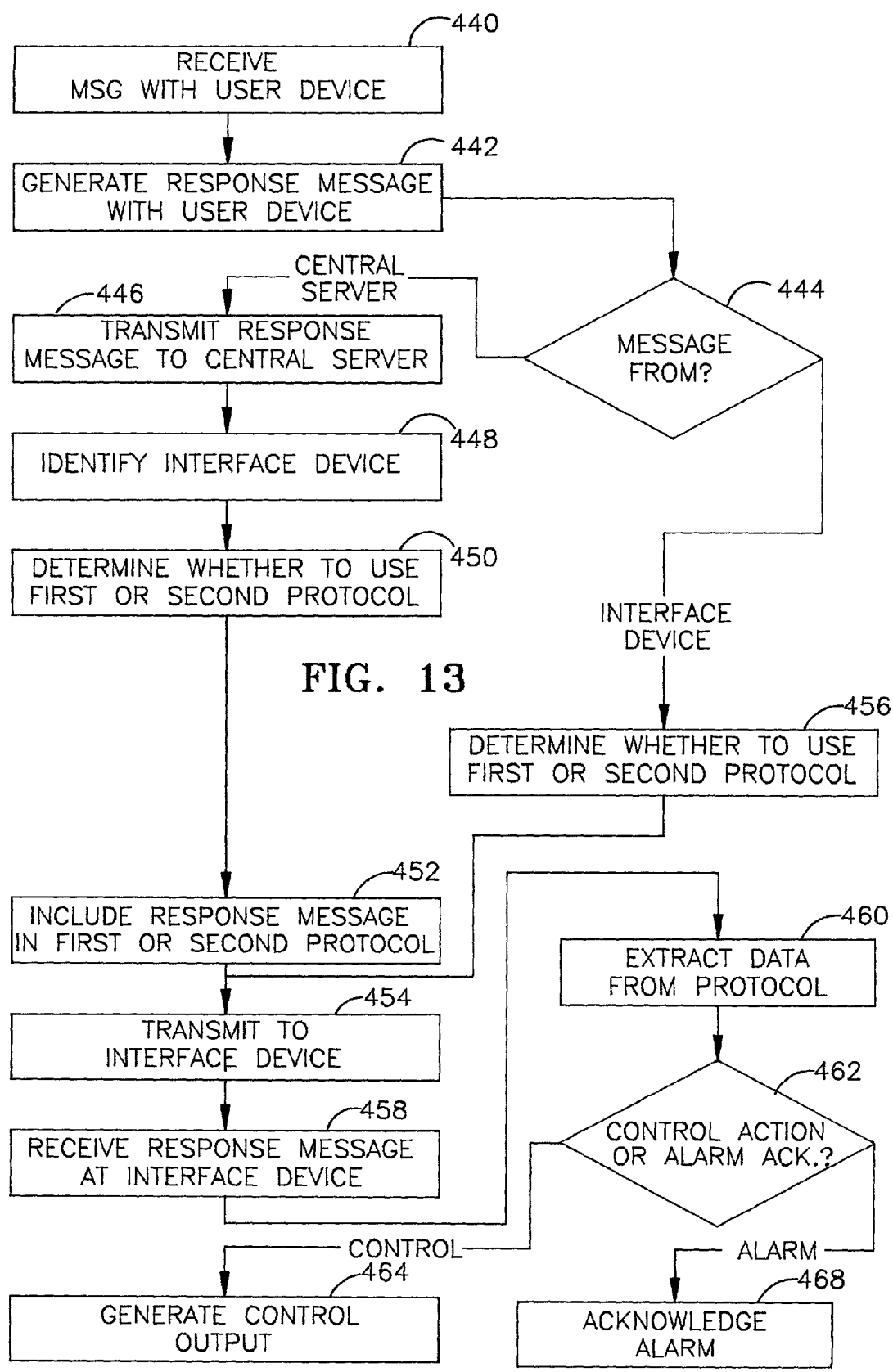
FIG. 13 is a flow diagram illustrating operation of one embodiment of the user device depicted in FIG. 1.

FIG. 13 is a process flow diagram illustrating operation of the remote monitoring system 10 when a user responds to a message. As previously discussed, the message may be an alert message from the central server 16. Alternatively, the message may be an exception message or a datafile message from the interface device 14. The operation begins at block 440 when the user device 18 receives a message. At block 442, the user elects to generate a response message with the user device 18 based on the message. As previously discussed, the response message may include control instructions directed to the equipment associated with the remote site 12 identified in the message.

The user device 18 determines whether the message is from the interface device 14 or the central server 16 at block 444. If the message is from the central server 16, the response message is transmitted from the user device 18 to the central server at block 446. At block 448, the response message is received by the network interface component 226 and the interface device 14 associated with the remote site 12 is identified from the response message. The network interface component 226 determines whether to use the first protocol or the second protocol at block 450. The first or second protocol-processing component 220, 222 is activated to include the response message in the first or second protocol, respectively, at block 450. At block 454, the response message is transmitted by the network interface component 226 over the wireless network 50 to the interface device 14.

If the message is from the interface device 14 at block 444, the user device 18 determines whether to include the response in the first protocol or the second protocol at block 456. At block 454, the response message is transmitted over the wireless network 50 to the interface device 14.

The interface device 14 receives the response message with the remote communication module 142 at block 458. At block 460 the protocol configuration module 140 extracts the data from either the first protocol or the second protocol. The protocol configuration module 140 and the processor 132 determine if the response message is a control action or an alarm acknowledgement at block 462. If the response message is a control action, at block 464, the response message is processed and corresponding control outputs are generated by the external I/O module 134 and forwarded to the identified equipment associated with the remote site 12, or the control output data is passed to a third party device 130 for further execution. If the response is an alarm acknowledgment, at block 466 the processor 132 receives the alarm acknowledge data and stops further transmission of exception and/or datafile messages.

The previously discussed embodiments of the remote monitoring system 10 provide a highly customizable mechanism for monitoring and controlling a remote site 12 while minimizing wireless airtime. By allowing a user the capability to relatively easily configure not only when communications with a remote site 12 occurs but also the exact content of the information communicated, efficient utilization of wireless airtime may be optimized. Further, since the user's ability to control the communication goes well beyond simply selecting reports to actually customizing data string(s) within the first protocol to selectively include only that information the user identifies as appropriate, the maximum amount of information may be packed into the minimum amount of wireless airtime. In addition, the ability to fully configure when, where and how alert messages are sent, along with the capability to remotely configure and customize the remote monitoring system 10 allows users a convenient, simple and cost-effective way to monitor and control remote sites 12.

While the present invention has been described with reference to specific exemplary embodiments, it will be evident that various modifications and changes may be made to these embodiments without departing from the broader spirit and scope of the invention as set forth in the claims. For example, the invention is designed to be adaptable to all forms of electronic communication, be they cellular telephone, land line telephone, electronic mail, satellite, facsimile, text page, voice mail, etc. In addition, all forms of electronic media are contemplated for the user device 18. Further, multiple formats of incoming and outgoing messages to the central server 16 are contemplated as within the scope of the invention. Accordingly, the specification and drawings are to be regarded in an illustrative rather than a restrictive sense.

What is claimed is:

1. A method of monitoring and controlling remote equipment to minimize wireless airtime, the method comprising:
   constructing a protocol to include a data string for use in an interface device, the selection, configuration, and definition of data to be included within the data string fully customizable by a user via a server computer in a user adjustable format to minimize wireless airtime;

downloading the constructed protocol to the interface device;

the interface device selectively triggering transmittal of an exception message with the protocol over a control channel of a wireless mobile telephone network as a function of user specified operational conditions;

the interface device selectively triggering transmittal of a datafile message over a voice channel of the wireless telephone network with another protocol as a function of the user specified operational conditions; and selectively generating an alert message to a user device as a function of at least one of the exception message or the datafile message, or combinations thereof and consideration of a user configured message profile.

2. The method of claim 1, wherein constructing a protocol comprises the user via the server computer selectively configuring the data string with operational parameters of the remote equipment indicative of the operational conditions based on space available within a datapacket.

3. The method of claim 1, wherein constructing a protocol comprises the user via the server computer customizing the structure of the data string with a user configured customization template to selectively include operational parameters of the remote equipment indicative of the operational conditions.

4. The method of claim 1, wherein selectively triggering transmittal of an exception message comprises the interface device applying user configured logic statements to operational conditions, wherein the logic statements are configured in the interface device by a user via the server computer to minimize wireless airtime and to generate with the interface device an exception message indicative of the operational conditions.

5. The method of claim 1, wherein selectively triggering transmittal of an exception message comprises generating the exception message with the interface device, and transmitting the exception message to a user device.

6. The method of claim 1, wherein selectively generating an alert message comprises selecting at least one user device to receive the alert message with the user configured message profile as a function of information included in at least one of the exception message or the datafile message or the combination thereof.

7. The method of claim 1, wherein selectively generating an alert message comprises including information from an external knowledge base in the alert message as a function of at least one of the exception message or the datafile message or the combination thereof.

8. The method of claim 1, further comprising transmitting a response message from the user device in response to the alert message, the response message operable to control operation of remote equipment via the interface device.

9. The method of claim 1, wherein the exception message and the datafile message include data indicative of the operational condition of the remote equipment.

10. The method of claim 1, wherein constructing a protocol with a data string comprises the user defining via the server computer a data to be transmitted in the data string by selection of a location of the data in the datastring.

11. The method of claim 1, wherein the user specified operational conditions and the user configured message profile are fully customizable by a user via the server computer.

12. A method of monitoring and controlling remote equipment to minimize wireless airtime, the method comprising:

configuring an interface device to interface with remote equipment and selectively communicate over a wireless network with one of a first protocol and a second protocol;

specifying in the interface device over a communication link a format of data to be included in a user customized data string included in the first protocol that comprises defining the data to be included in the user customized data string by definition of a bit location of the data in the user customized data string, wherein the data is indicative of at least one operational parameter of the remote equipment;

monitoring the at least one operational parameter of the remote equipment with the interface device;

the interface device transmitting a message with the first protocol in response to user specified operating conditions, the first protocol comprising the user customized data string indicative of the at least one operational parameter; and the interface device transmitting a message over a wireless communication channel with the second protocol in response to user specified operating conditions, the message comprising operational data.

13. The method of claim 12, wherein configuring an interface device comprises specifying with user specified operating conditions when the first and second protocols are selectively utilized, wherein the user specified operating conditions are specified in the interface device over the communication link.

14. The method of claim 12, wherein configuring an interface device comprises constructing in the interface device over the communication link a user configured logic statement to selectively initiate generation of the user customized data string with the interface device.

15. The method of claim 12, wherein configuring an interface device comprises configuring the interface device over the communication link to communicate with an intelligent device, the intelligent device enabled to communicate via the interface device with the first and second protocol over the wireless network.

16. The method of claim 12, wherein the interface device transmitting a message with the first protocol comprises transmitting in response to operating conditions warranting immediate attention and the interface device transmitting a message over a wireless communication channel with the second protocol comprises accumulating operational data in a datafile prior to transmission.

17. The method of claim 12, wherein the interface device transmitting a message with the first protocol comprises transmitting the first protocol with one of a control channel and a transport protocol in response to user specified operating conditions that are specified in the interface device by the user over the communication link.

18. The method of claim 12, wherein the interface device transmitting a message with the first protocol and the interface device transmitting a message over a wireless communication channel with the second protocol comprise transmitting to one of a user device and a central server as a function of a user specified configuration, wherein the user specified configuration is configurable in the interface device over the communication interface based on application specific considerations.

19. The method of claim 12, wherein specifying in the interface device over a communication link a format of data comprises communicating with the interface device over the communication link with one of a server computer or a user device, or a combination thereof to configure the operational functionality of the interface device.

20. The method of claim 12, wherein specifying in the interface device over a communication link a format of data comprises the user having the capability to limit the data to be included in the data string to only that which is desired by the user.

21. A system for monitoring and controlling remote equipment, the system comprising:
 a processor;
 a local input/output module electrically coupled with the processor, the local input/output module operable to monitor operational parameters of the remote equipment; and
 a remote communication module electrically coupled with the processor,
 the remote communication module operable to wireless transmit messages with one of a first protocol and a second protocol as a function of at least one of user specified operational conditions and the operational parameters, the first protocol comprising a user customizable data string and the second protocol comprising operational data; and
 wherein selection, configuration, and definition of data to be included in the user customizable datastring is configurable by a user via the remote communication module to specify a user adjustable format in the user customizable datastring of data representative of at least one of the operational parameters.

22. The system of claim 21, further comprising a central server in communication with the remote communication module, the central server operable to receive and process the first and second protocols.

23. The system of claim 22, wherein the central server is operable to selectively transmit an alert message to a user device as a function of a user configured message profile and data provided by at least one of the first and second protocol.

24. The system of claim 21, further comprising a user device in communication with the remote communication module, the user device operable to receive and process the first and second protocols.

25. The system of claim 21, wherein the communication module is operable to transmit the first protocol with one of a wireless control channel and a wireless transport protocol.

26. The system of claim 12, wherein the remote communication module is operable to transmit the second protocol with a wireless communication channel.

27. The system of claim 21, further comprising a local communication module electrically coupled with the processor, wherein the user customizable data string is configurable by a user via the local communication module or the remote communication module.

28. The system of claim 21, further comprising a data storage module coupled with the processor, wherein the configured user customizable data string is storable in the data storage module by the user to be retrievable when the remote communication module is operable to wireless transmit messages with the first protocol.

29. The system of claim 21, wherein the user customizable data string is configurable by a user via the remote communication module to specify bit locations in the user customizable data string of data representative of at least one of the operational parameters.

30. The system of claim 21, wherein the user customizable data string is fully configurable by a user via the remote communication module to construct a customized multi-digit code that is useable in the data string to be representative of only user selected operational parameters.

31. A method of monitoring and controlling remote equipment to minimize wireless airtime, the method comprising:
 configuring an interface device to interface with remote equipment and selectively communicate over a wireless network with one of a first protocol and a second protocol;
 specifying in the interface device over a communication link a format of data to be included in a user customized data string included in the first protocol that comprises defining over the communication link a plurality of data strings and corresponding logic statements representative of conditions when each of the datastrings will be used by the interface device within the first protocol, wherein the data is indicative of at least one operational parameter of the remote equipment;
 monitoring the at least one operational parameter of the remote equipment with the interface device;
 the interface device transmitting a message with the first protocol in response to user specified operating conditions, the first protocol comprising the user customized data string indicative of the at least one operational parameter; and
 the interface device transmitting a message over a wireless communication channel with the second protocol in response to user specified operating conditions, the message comprising operational data.

32. A method of monitoring and controlling remote equipment to minimize wireless airtime, the method comprising:
 configuring an interface device to interface with remote equipment and selectively communicate over a wireless network with one of a first protocol and a second protocol;
 specifying in the interface device over a communication link a format of data to be included in a user customized data string included in the first protocol that comprises configuring over the communication link the size of the data string to fit within a datapacket of a predetermined size, wherein the data is indicative of at least one operational parameter of the remote equipment;
 monitoring the at least one operational parameter of the remote equipment with the interface device;
 the interface device transmitting a message with the first protocol in response to user specified operating conditions, the first protocol comprising the user customized data string indicative of the at least one operational parameter; and
 the interface device transmitting a message over a wireless communication channel with the second protocol in response to user specified operating conditions, the message comprising operational data.

* * * * *

UNITED STATES PATENT AND TRADEMARK OFFICE
CERTIFICATE OF CORRECTION

| | | |
|---|---|---|
| PATENT NO. | : 7,228,129 B1 | Page 1 of 1 |
| APPLICATION NO. | : 10/102335 | |
| DATED | : June 5, 2007 | |
| INVENTOR(S) | : Thomas Owen Ward | |

It is certified that error appears in the above-identified patent and that said Letters Patent is hereby corrected as shown below:

On the title page: item (75): Remove Inventor Steven Hodges

Signed and Sealed this

Fourteenth Day of August, 2007

JON W. DUDAS
*Director of the United States Patent and Trademark Office*